(12) United States Patent
Karpov et al.

(10) Patent No.: US 10,183,276 B2
(45) Date of Patent: Jan. 22, 2019

(54) RHODIUM-CONTAINING CATALYSTS FOR AUTOMOTIVE EMISSIONS TREATMENT

(71) Applicants: BASF Corporation, Florham Park, NJ (US); Georgia Tech Research Corporation, Atlanta, GA (US)

(72) Inventors: Andrey Karpov, Speyer (DE); David Preli, Brooklyn, NY (US); Knut Wassermann, Princeton, NJ (US); Andreas Sundermann, Bensheim (DE); Sang-Il Choi, Atlanta, GA (US); Younan Xia, Atlanta, GA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/546,836

(22) PCT Filed: Jan. 29, 2016

(86) PCT No.: PCT/US2016/015722
§ 371 (c)(1),
(2) Date: Jul. 27, 2017

(87) PCT Pub. No.: WO2016/123523
PCT Pub. Date: Aug. 4, 2016

(65) Prior Publication Data
US 2018/0021757 A1 Jan. 25, 2018

Related U.S. Application Data

(60) Provisional application No. 62/109,500, filed on Jan. 29, 2015.

(51) Int. Cl.
| | | |
|---|---|---|
| *B01J 23/46* | (2006.01) | |
| *B01J 35/00* | (2006.01) | |
| *B01J 37/06* | (2006.01) | |
| *B01J 37/02* | (2006.01) | |
| *B01J 21/04* | (2006.01) | |
| *B01J 37/00* | (2006.01) | |
| *B01D 53/94* | (2006.01) | |
| *B01J 37/16* | (2006.01) | |
| *B01J 23/44* | (2006.01) | |
| *B01J 37/08* | (2006.01) | |
| *F01N 3/10* | (2006.01) | |

(52) U.S. Cl.
CPC .......... *B01J 23/464* (2013.01); *B01D 53/945* (2013.01); *B01J 21/04* (2013.01); *B01J 23/44* (2013.01); *B01J 35/006* (2013.01); *B01J 35/0006* (2013.01); *B01J 35/008* (2013.01); *B01J 35/0013* (2013.01); *B01J 35/0086* (2013.01); *B01J 37/009* (2013.01); *B01J 37/0072* (2013.01); *B01J 37/024* (2013.01); *B01J 37/0211* (2013.01); *B01J 37/0213* (2013.01); *B01J 37/0221* (2013.01); *B01J 37/0236* (2013.01); *B01J 37/06* (2013.01); *B01J 37/16* (2013.01); *B01D 2255/1023* (2013.01); *B01D 2255/1025* (2013.01); *B01D 2255/204* (2013.01); *B01D 2255/206* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/707* (2013.01); *B01D 2255/9202* (2013.01); *B01J 35/002* (2013.01); *B01J 37/0018* (2013.01); *B01J 37/08* (2013.01); *F01N 3/10* (2013.01); *F01N 2570/10* (2013.01); *F01N 2570/12* (2013.01); *F01N 2570/14* (2013.01); *Y02T 10/22* (2013.01)

(58) Field of Classification Search
CPC .. B01D 53/94; B01D 53/9445; B01D 53/945; B01D 53/865; B01D 2255/10; B01D 2255/1025; B01D 2258/01; B01D 2258/012; B01J 23/464; B01J 35/006; B01J 35/023; B01J 37/00; B01J 2523/822; F01N 3/101; B82B 3/0009; B82B 3/0038; B82B 99/00
See application file for complete search history.

(56) References Cited

U.S. PATENT DOCUMENTS

| | | | |
|---|---|---|---|
| 4,171,288 A | 10/1979 | Keith et al. | |
| 9,126,191 B2 * | 9/2015 | Yin | ............. B01J 23/42 |
| 9,156,025 B2 * | 10/2015 | Qi | ............. B01J 37/0228 |
| 9,533,299 B2 * | 1/2017 | Qi | ............. B01J 37/0228 |
| 2006/0094595 A1 | 5/2006 | Labarge | |
| 2011/0206753 A1 | 8/2011 | Karpov et al. | |
| 2012/0263633 A1 | 10/2012 | Koplin et al. | |
| 2013/0213018 A1 | 8/2013 | Yin et al. | |
| 2014/0140909 A1 * | 5/2014 | Qi | ............. B01J 37/0228 |
| | | | 423/212 |

FOREIGN PATENT DOCUMENTS

DE 102008040849 2/2010

OTHER PUBLICATIONS

International Search Report and Written Opinion for PCT Patent Application No. PCT/US16/15722, dated Jul. 1, 2017, 12 pages.
Gandhi, et al., "Automotive Exhaust Catalysis", Journal of Catalysis, vol. 216, 2003, pp. 433-442.
Goto, et al., "Impact of Pd—Rh Interaction on the Performance of Three-Way Catalysts", SAE Technical Paper 2014-01-1503, 2014, doi:10.4271/2014-01-1.

(Continued)

*Primary Examiner* — Timothy C Vanoy
(74) *Attorney, Agent, or Firm* — Womble Bond Dickinson (US) LLP

(57) ABSTRACT

Catalytic materials, and in particular, rhodium-containing catalytic materials for exhaust gas purifying catalyst composites are provided herein. Such materials comprise multimetallic Rh-containing nanoparticles, which are present primarily inside aggregated particles of a support (such as alumina). Such catalytic materials can exhibit excellent conversion of hydrocarbons and nitrogen oxides.

40 Claims, 10 Drawing Sheets

(56) References Cited

OTHER PUBLICATIONS

Graham, et al., "Aging-Induced Metal Redistribution in Bimetallic Catalysts", Catalysis Letters, vol. 81, Issue 1, 2002, pp. 1-7.

Nunan, et al., "Impact of Pt—Rh and Pd—Rh Interactions on Performance of Bimetal Catalysts", SAE Technical Paper 950258, 1995.

Renzas, et al., "Rh1—xPdx Nanoparticle Composition Dependence in CO Oxidation by NO", Catalysis Letters, vol. 141, Issue 2, 2011, pp. 235-241.

Renzas, et al., "Rh1-Xpdxnanoparticle Composition Dependence in Co Oxidation by Oxygen: Catalytic Activity Enhancement in Bimetallic Systems ", Physical Chemistry Chemical Physics, vol. 13, Issue 7, pp. 2556-2562, 2011.

Tao, et al., "Reaction-Driven Restructuring of Rh—Pd and Pt—Pd Core-Shell Nanoparticles", Science, vol. 322, Issue 5903, 2008, pp. 932-934.

Vedyagin, et al., "Catalytic Purification of Exhaust Gases Over Pd—Rh Alloy Catalyst", Topics in Catalysis, vol. 56, Issue 11, 2013, pp. 1008-1014.

Vedyagin, et al., "Stabilization of Active Sites in Alloyed Pd—Rh Catalysts on Γ-Al2o3 Support", Catalysis Today, vol. 238, 2014, pp. 80-86.

Scott, M.S. et al., "Structural Analysis of Rh—Pd/CeO2 Catalysts Under Reductive Conditions: An X-ray Investigation", Top Catal., [Epub.] Dec. 17, 2014, vol. 58 pp. 123-133.

Taillades-Jacquin, M. et al., "Novel mesoporous aluminosilicate supported palladium-rhodium catalysts for diesel upgrading: I. Preparation and characterisation", Applied Catalysis A: General, Jun. 1, 2008, vol. 340, pp. 250-256.

Reneme, Y. et al., "Comparative surface analysis and TAP measurements to probe the NO adsorptive properties of natural gas vehicle Pd—Rh/Al2O3 catalyst", Applied Catalysis B: Environmental, Nov. 2014, vols. 160-161, pp. 390-399.

Rassoul, M. et al., "Synthesis and Characterisation of Bimetallic Pd—Rh/Alumina Combustion Catalysts", Journal of Catalysis, Oct. 1, 2001, vol. 203, pp. 232-241.

\* cited by examiner

Example 1.1

Example 1.1

Example 1.2

Example 1.2

Example 1.3

Example 1.3

Example 1.4

Example 1.4

Example 1.5

Example 1.5

Example 1.6

Example 1.6

Example 1.7

Example 1.7

Example 2.3

COMPARATIVE
Example 3.3

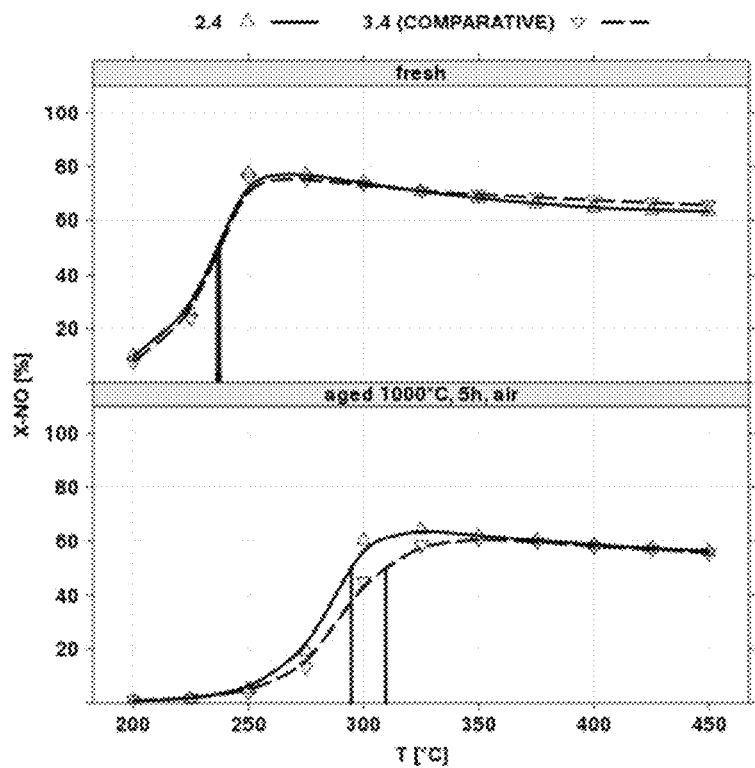
FIG 17: NO light-off for example 2.4 and COMPARATIVE example 3.4
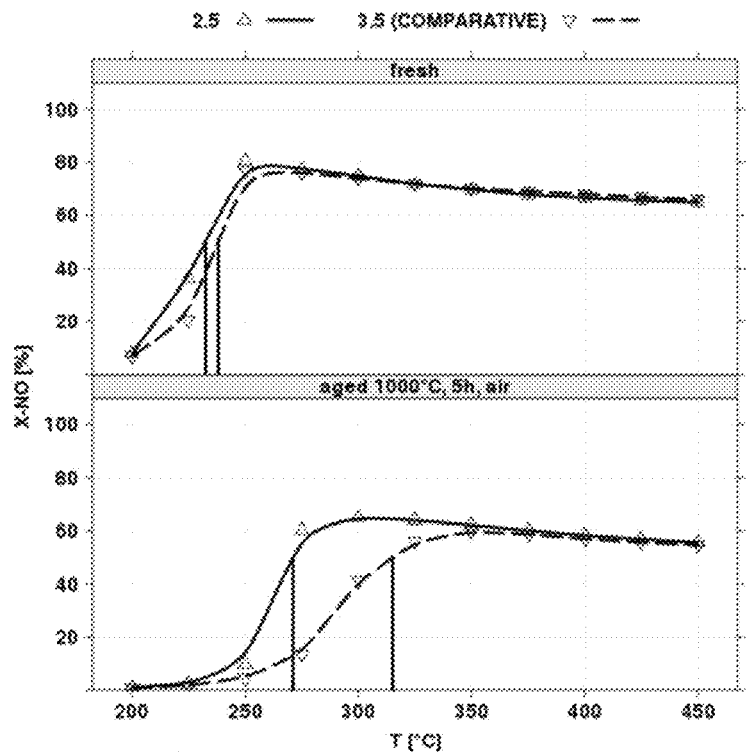
FIG 18: NO light-off for example 2.5 and COMPARATIVE example 3.5

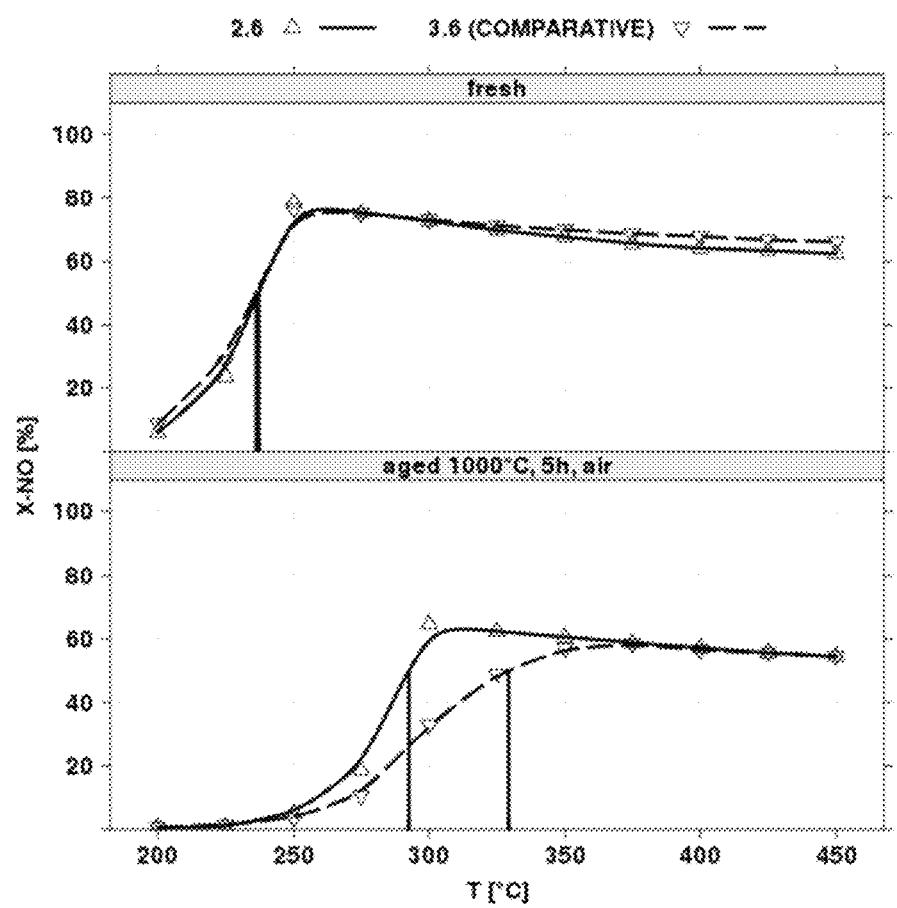
FIG 19: NO light-off for example 2.6 and COMPARATIVE example 3.6

RHODIUM-CONTAINING CATALYSTS FOR AUTOMOTIVE EMISSIONS TREATMENT

CROSS-REFERENCE TO RELATED APPLICATIONS

The present application is a U.S. National Stage of International Patent Application PCT/US2016/015722 filed Jan. 29, 2016 and claims priority to U.S. Provisional Patent Application No. 62/109,500 filed Jan. 29, 2015. The disclosures of each of the applications noted above are incorporated herein by reference in their entirety.

TECHNICAL FIELD

The present invention is directed to catalytic materials for exhaust gas purifying catalyst composites and methods of making and use. More particularly, the invention pertains to rhodium-containing catalysts comprising a majority of multimetallic nanoparticles inside aggregated particles of a support. Excellent conversion of hydrocarbons and nitrogen oxides is achieved.

BACKGROUND OF THE INVENTION

Current automotive catalysts for exhaust treatment of gasoline-powered vehicles include three way catalysts (TWCs) or four way catalysts (FWCs™). Such catalysts utilize palladium (Pd) and rhodium (Rh) as active species for conversion of hydrocarbons, CO, and $NO_x$ pollutants into harmless $CO_2$, $N_2$ and $H_2O$. Pd is an active component for oxidation of hydrocarbons and CO into $CO_2$, and Rh is the most efficient component for conversion of $NO_x$ into $N_2$. Accordingly, both Pd and Rh are generally required for simultaneous high conversion of these three pollutants into harmless products. One of the main challenges in TWC design is how to most effectively use Rh. H. S. Gandhi et al., Journal of Catalysis, 2003, 216, 433-442, p. 435 provides a comprehensive overview of scenarios of Rh deactivation in TWCs. Rh deactivation mechanisms include rhodium aluminate formation, dissolution of Rh into alumina support material, encapsulation of the Rh by alumina, and spreading and interaction of Rh oxide over the alumina support surface. When Rh is utilized in the presence of Pd under oxidizing conditions up to temperatures of about 1000 K, Pd—Rh alloys can form and the Pd can form PdO that covers the surface of the Pd—Rh alloys, which can strongly suppress $NO_x$ conversion. To avoid undesirable formation of Pd—Rh alloys, current Pd/Rh three way catalyst formulations often use "fixation" of Pd and Rh on separate support phases (H. S. Gandhi et al., Journal of Catalysis, 2003, 216, 433-442, p. 437). However, even if Pd and Rh are loaded on separate support phases, formation of Pd—Rh alloy particles with an average size of >100 nm can still be observed using transmission electron microscopy (TEM) characterization. G. W. Graham et al., Catalysis Letters, 2002, 81, 1-7 (showing such particles after redox aging of a bimetallic Pd- and Rh-containing catalyst at 1050° C. for 12 h and noting that the surface of the Pd—Rh alloy particles was enriched with Pd, which is thought to be undesirable).

M. Rassoul et al., Journal of Catalysis, 2001, 203, 232-241 describe a bimetallic Pd—Rh/$Al_2O_3$ catalyst prepared by co-impregnation or stepwise impregnation of alumina from solutions of $RhCl_3$ and $H_2PdCl_4$. Furthermore Rassoul et al. teach that $Rh_2O_3$ and PdO particles on the surface of catalysts obtained by the co-impregnation technique behave like respective monometallic catalysts. On the other hand, when the catalyst was prepared by stepwise impregnation, some $Rh_2O_3$ and PdO oxide particles were in strong interaction. While the addition of Rh by a stepwise impregnation technique improved the thermal stability of PdO, the majority of the Rh was lost in the bulk of the support. Rassoul et al. does not provide any indication of formation of bimetallic palladium-rhodium nanoparticles. Another example of a Pd—Rh/$Al_2O_3$ catalyst prepared by co-impregnation of Pd and Rh solutions on high surface area alumina support is described by Y. Reneme et al., Applied Catalysis B: Environmental, 2014, 160-161, 390-399.

Nunan et al. in SAE Meeting Paper (ISSN 0148-7191) N.950258 (1995) describe the impact of Pt—Rh and Pd—Rh interactions on the performance of bimetal catalysts. Under laboratory aging conditions, Nunan et al. conclude that nonalloyed Pt—Rh and Pd—Rh catalysts were "dominated by the Rh activity, whereas the alloyed Pd—Rh catalyst's performance was similar to that of the single-metal Pd catalyst. Pt—Rh or Pd—Rh alloying strongly impaired high-temperature hydrocarbon conversion or NO(sub)x conversion, respectively." Nunan et al. determined that superior performance is achieved when Pd and Rh catalysts are prepared so as to prevent alloying.

Goto et al. disclose that formation of a Pd—Rh core-shell structured alloy with Rh in its core has a large negative impact on $NO_x$ performance. SAE Technical Paper 2014-01-1503, 2014, doi:10.4271/2014-01-1503. Examples in Goto et al. discuss the formation of homogeneously dispersed Pd and Rh particles on La/$Al_2O_3$ support material using a proprietary fixation method and partial formation of Pd—Rh alloyed nanoparticles was observed after aging at 1000° C. in size ranges of 20 to 50 nm. The paper states that there are benefits of a strategically-designed coexistence of Pd and Rh. According to the paper, an optimal Pd/Rh ratio is 1.2 in a top layer, which achieved better light-off activity compared to a Pd/Rh ratio of 2.4 where no Pd was in the Rh layer.

A. A. Vedyagin et al. describe a Pd—Rh alloy catalyst prepared by impregnation of alumina support with dual complex salt $[Pd(NH_3)_4]_3[Rh(NO_2)_6]_2$ in Topics in Catalysis, 2013, 56, 1008-104 and in Catalysis Today, 2014, 238, 80-86.

J. R. Renzas et al. disclose an examination of bimetallic 15 nm Pd-core Rh-shell $Rh_{1-x}Pd_x$ nanoparticles deposited on Si wafers for CO oxidation by $O_2$ and CO oxidation by NO, respectively in Phys. Chem. Chem. Phys., 2011, 13, 2556-2562 and in Catalysis Letters 2011, 141, 235-241.

Tao et al. describe that heterogeneous catalysts containing bimetallic nanoparticles may undergo segregation of the metals, driven by oxidizing and reducing environments. Science, 2008, 322, 932-934

In U.S. Patent Appln. No. 2012/0263633 metal oxide support materials containing nanoscaled iron-platinum group metal particles having a particle size from 0.5 to 10 nm are disclosed, originating from precursor soluble salts, wherein at least 70% of the nanoscaled iron-platinum group metal particles are located on an outside surface layer of the metal oxide support material. This application further teaches that a uniform distribution of the PGMs located in the innermost layer of alumina is undesirable, since PGMs in the innermost layer of the alumina are not accessible for catalysis. There is a continuing need in the art to provide catalytic particles that provide excellent catalytic activity, thermal stability, and/or efficient use of a rhodium component.

SUMMARY OF THE INVENTION

Provided are thermally stable Rh-containing multimetallic particles (e.g., Rh-containing platinum group metal (PGM) multimetallic particles). Rh-containing multimetallic nanoparticles are thermally affixed to refractory metal oxide supports (e.g., alumina) during formation of Rh-containing catalytic materials and catalyst composites so as to minimize negative interactions between Rh and the support (e.g., between Rh and $Al_2O_3$) and in a way that nanoparticles remain dispersed and not agglomerated. The catalytic material is stable under high aging temperatures, for example, aging temperatures above about 850° C.

In a first aspect, a catalytic material is provided that comprises a porous refractory metal oxide support and a plurality of rhodium-containing multimetallic nanoparticles (e.g., in the form of aggregated particles), wherein at least about 50% by weight of the nanoparticles are located inside the aggregated particles of the support. In some embodiments, at least about 90% by weight of the nanoparticles may be inside the aggregated particles of the support. The support may, in certain embodiments, comprise alumina. The rhodium-containing multimetallic nanoparticles may, in certain embodiments, comprise palladium-rhodium bimetallic nanoparticles. An average primary particle size of the rhodium-containing multimetallic nanoparticles may be, for example, in the range of about 1 nm to about 20 nm, or about 3 nm to about 15 nm, or even about 5 nm to about 10 nm, as measured by Transmission Electron Microscopy (TEM). In some embodiments, the average primary particle size of the multimetallic nanoparticles may remain in these ranges (e.g., about 1 nm to about 20 nm) as measured by TEM after calcination at 550° C. for two hours in air of the catalytic material, starting in a fresh state.

The rhodium-containing multimetallic nanoparticles may, in some embodiments, be colloidally delivered and may be thermally affixed to the support to form the catalytic material. The support may, in some embodiments, also be colloidally delivered. Alternatively, the support may be pre-calcined. In certain embodiments, combinations of both colloidally delivered and pre-calcined support material may be used.

The support may, in some embodiments, have an average primary particle size of about 1 nm to about 100 nm as measured by TEM. In certain embodiments, the support may have an average aggregated particle size that is about 1 micron or greater, as measured by Scanning Electron Microscopy (SEM).

The catalytic material may be effective for conversion of one or more components of an exhaust stream of an internal combustion engine. In various embodiments, the catalytic material may comprise a promoter and/or a stabilizer in an amount of about 0.1 to about 30% by weight. The promoter and/or the stabilizer may be, for example, a rare earth oxide, e.g., comprising ceria, lanthana, neodymia, gadolinia, yttria, praseodymia, samaria, hafnia, or combinations thereof. The promoter and/or the stabilizer may be, for example, an alkaline earth oxide, e.g., comprising barium or strontium oxide or a combination thereof.

The catalytic material may, in some embodiments, have a Barrett, Joyner, Halenda (BJH) desorption average pore radius of about 3 to about 30 nanometers as measured by nitrogen-pore size distribution ($N_2$-PSD). The catalytic material may, in some embodiments, have a Brunauer-Emmett-Teller (BET) surface area greater than or equal to about 30 $m^2$/g as measured by nitrogen adsorption isotherm.

In certain embodiments, the multimetallic nanoparticles may remain in particle form and, preferably, the metals do not segregate or dissolve into the aggregated particles of the support material after calcination at 550° C. for two hours in air of the catalytic material starting in a fresh state. The rhodium-containing multimetallic nanoparticles disclosed herein may, in some embodiments, further comprise palladium, platinum, ruthenium, osmium, iridium, copper, gold, and/or silver. Where the multimetallic nanoparticles comprise Rh and Pd components, the Pd:Rh weight ratio may vary and, in some embodiments, can be in the range of about 95:5 to about 5:95. Non-limiting, exemplary weight ratios of Pd:Rh may be about 1:1 to about 3:1 and about 1.3:1 to about 2.7:1.

In certain embodiments, upon calcination in air at 550° C. for 2 hours, 50% or more by weight of the rhodium may have a binding energy in the range of 307-309 eV as measured by X-ray photoelectron spectroscopy (XPS).

In a specific embodiment, the refractory metal oxide support comprises alumina and optionally comprises up to about 30% of a promoter and/or a stabilizer; the catalytic material BJH desorption average pore radius is about 3 to about 20 nanometers as measured by $N_2$-PSD; and the rhodium-containing multimetallic nanoparticles are colloidally-delivered and have an average primary particle size of about 1 to about 20 nanometers as measured by TEM. The catalytic material may have a lower deactivation rate than a comparative catalytic material that comprises individual rhodium and metal components as delivered by individual salts. The catalytic material may have a higher $NO_x$ conversion activity than a comparative catalytic material that comprises individual rhodium and metal components as delivered by individual salts.

In another aspect, a catalyst composite for an exhaust stream of an internal combustion engine is provided, comprising: any catalytic material disclosed herein coated onto a carrier. The catalyst composite may further comprise one or more additional platinum group metals and/or refractory metal oxide supports and/or promoters and/or stabilizers coated onto the carrier in the same layer as or a different layer than the catalytic material disclosed herein.

A further aspect provides a system for treatment of an internal combustion engine exhaust stream including hydrocarbons, carbon monoxide, nitrogen oxides, and other exhaust gas components, the emission treatment system comprising an exhaust conduit in fluid communication with the internal combustion engine via an exhaust manifold and any catalyst composite disclosed herein.

A still further aspect provides a method for treating exhaust gases comprising contacting a gaseous stream comprising hydrocarbons, carbon monoxide, and nitrogen oxides with any catalyst composite disclosed herein.

In another aspect, the disclosure provides a method of making a catalytic material, the method comprising: (a) obtaining rhodium-containing multimetallic nanoparticles; (b) obtaining a refractory metal oxide support; (c) preparing a solution of the nanoparticles of step (a) and the support of step (b) to form a catalytic material solution, wherein the support is in the form of aggregated particles; and (d) drying and calcining the catalytic material solution of step (c) to form the catalytic material wherein at least 50% by weight of the rhodium-containing multimetallic nanoparticles are located inside aggregated particles of the support and are thermally affixed to the support.

With regard to such methods, the rhodium-containing multimetallic nanoparticles may, in some embodiments, have an average primary particle size of about 3 nm to about 20 nm as measured by TEM. Step (b) may, in certain embodiments, comprise obtaining nanoparticles of a refractory metal oxide support or a precursor of a refractory metal oxide support that comprise an average primary particle size of about 1 nm to about 100 nm, as measured by TEM and step (c) may, in certain embodiments, comprise preparing an aqueous colloidal solution of the rhodium-containing nanoparticles of step (a) and the nanoparticles of step (b) to form the catalytic material solution. In other embodiments, step (b) may comprise obtaining a pre-calcined refractory metal oxide support with an average primary aggregate size of about 1 micron or greater.

In some embodiments, step (a) may comprise: forming an aqueous solution of a salt of rhodium and another metal, a reducing agent, and a surfactant; and mixing and heating the aqueous solution, thereby reducing at least a portion of the metal therein to a zero valance form by action of the reducing agent in the presence of the surfactant and thus forming an aqueous solution of rhodium-containing multimetallic nanoparticles. The reducing agent may comprise, for example, tetraethylene glycol, ascorbic acid ($C_6H_8O_6$), oxalic acid ($C_2H_2O_4$), formic acid (HCOOH), and/or sodium borohydride ($NaBH_4$). The surfactant may comprise, for example, poly(vinylalcohol), poly(vinylpyrrolidone), poly(ethyleneimine), poly(acrylic acid), carbohydrates, and/or alkali metal citrates.

Upon calcination, the refractory metal oxide support may comprise a high surface area gamma alumina having a surface area of at least about 60 square meters per gram ($m^2/g$) and may optionally comprise up to about 30% by weight of a promoter and/or a stabilizer that comprises a rare earth oxide.

BRIEF DESCRIPTION OF THE DRAWINGS

The disclosure may be more completely understood in consideration of the following detailed description of various embodiments of the disclosure in connection with the accompanying drawings, in which:

FIG. 17 shows NO conversion vs. temperature diagrams for Example 2.4 and Comparative Example 3.4;

FIG. 18 shows NO conversion vs. temperature diagrams for Example 2.5 and Comparative Example 3.5; and FIG. 19 shows NO conversion vs. temperature diagrams for Example 2.6 and Comparative Example 3.6.

DETAILED DESCRIPTION OF THE INVENTION

Figure 1:
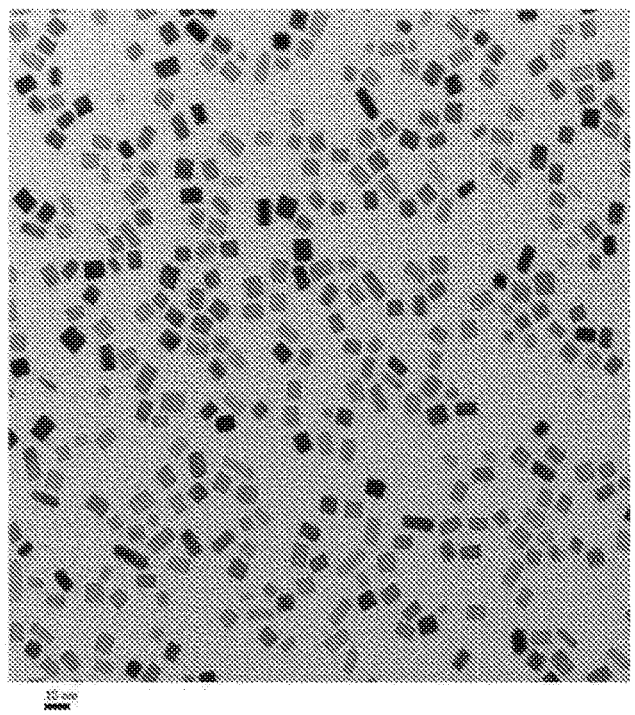
FIGS. 1-2 provide TEM images of Pd nanoparticles of Example 1.1.

Providing thermally-stable rhodium (Rh)-containing platinum group metal (PGM) particles has a tremendous impact on catalyst performance. Provided herein are Rh-containing PGM multimetallic nanoparticles thermally affixed within and to aggregated particles of a refractory metal oxide support during formation of PGM-containing catalytic materials and catalyst composites. The Rh-containing PGM multimetallic nanoparticles are primarily dispersed inside the aggregated particles of the support, rather than residing on an external (or outside) surface layer of the support. The Rh-containing PGM multimetallic nanoparticles are particularly suitable for high temperature catalytic applications. These Rh-containing PGM multimetallic nanoparticles can be of various shapes, for example, spherical, cubic, octahedral, or icosahedral. Preferably, Rh-containing PGM multimetallic nanoparticles are Pd—Rh bimetallic nanoparticles. Preferred chemical compositions of Pd—Rh bimetallic nanoparticles that may be useful in the context of the catalysts disclosed herein is $Pd_xRh_y$ with x equal to about 5 to about 95 wt. % and y equal to about 5 to about 95 wt. %, more preferably with x equal to about 40 to about 90 wt. % and y equal to about 10 to about 60 wt. %, most preferably with x equal to about 50 to about 80 wt. % and y equal to about 20 to about 50 wt. %. A preferred average primary particle size for the Pd—Rh bimetallic nanoparticles is about 1 nm to about 20 nm, preferably about 2 to about 18 nm, about 3 to about 15 nm, or about 5 to about 10 nm.

Preparation of the catalytic material disclosed herein may be achieved in one non-limiting embodiment by introducing multimetallic nanoparticles, such as palladium-rhodium bimetallic nanoparticles during the formation of the support material before final pore sizes are set in the support material. Such a method results in excellent dispersion of the Pd—Rh bimetallic nanoparticles throughout the aggregated particles of the support material. The Pd—Rh bimetallic nanoparticles are thermally fixed to the support after the material is calcined as well to provide excellent stability.

Rhodium-containing multimetallic nanoparticles, for example Pd—Rh bimetallic nanoparticles, can provide a benefit of minimizing negative interactions between the rhodium and support (e.g., $Al_2O_3$). That is, the combination of metals such as palladium and rhodium within the nanoparticle as disclosed herein results in minimizing chemical interaction between rhodium and the support. Materials containing such multimetallic nanoparticles therefore are more active and more sinter-stable than materials containing conventional densely-provided particles residing primarily inside the support pores and having greater interactions with the support.

The following definitions are used herein.

Reference to "inside aggregated particles of the support" means inside the pores or voids internal to support materials (comprising aggregated particles) where a nanoparticle can reside and be substantially surrounded by support material. Inside aggregated particles of the support is in contrast to being located on an external surface of a support, where a particle can only be adjacent to the support material and not "inside" or "within" that support.

Rh-containing PGM multimetallic nanoparticles include a combination of rhodium with palladium (Pd), platinum (Pt), ruthenium (Ru), osmium (Os), and/or iridium (Ir). Other suitable metals that may provide catalytic activity, and which can optionally be included within the multimetallic nanoparticles include, but are not limited to copper (Cu), silver (Ag), and gold (Au). These components can be provided in varying ratios, as described in further detail herein.

A platinum group metal (PGM) component refers to any component that includes a PGM. For example, the PGM may be in metallic form (having a valence of zero), or the PGM may be in an oxide form. The PGM may be also in a mixed state. For example, a PGM component nanoparticle surface may be in an oxide form, whereas the PGM component nanoparticle core may be in metallic form. Reference to "PGM component" allows for the presence of the PGM in any valance state. For example, palladium may be present as $Pd^0$ and/or $Pd^{2+}$, or $Pd^{4+}$. As another example, rhodium may be present as $Rh^0$, $Rh^{1+}$, and/or $Rh^{3+}$.

A PGM nanoparticle is a nanoparticle comprising one or more PGM components. Typically, such PGM nanoparticles comprise substantially only PGMs (or PGM components) and can thus be described as consisting essentially of or consisting of PGM component(s), e.g., consisting essentially of or consisting of PGMs. It is noted that certain bimetallic/multimetallic nanoparticles disclosed herein are PGM nanoparticles; however, certain nanoparticles disclosed herein comprise one or more metal components other than PGMs, as described herein below A "bimetallic" or "multimetallic" nanoparticle comprises two or more metals in the same particle, whose average primary particle size is <about 1 micron, preferably less than about 100 nm, more preferably in the range of about 1 nm to about 20 nm, about 2 to about 18 nm, about 3 to about 15 nm, or about 5 to about 10 nm. A bimetallic or multimetallic nanoparticle according to the present disclosure is the result of co-precipitating Rh and one or more other components (e.g., including, but not limited to, one or more other PGM components) during preparation of nanoparticles and is not the result of simply impregnating two kinds of metal precursor salts onto a support. Again, some such bimetallic/multimetallic nanoparticles comprise substantially only PGM components, i.e., consist essentially of or consist of PGM components (e.g., Rh and one or more of Ru, Pd, Os, Ir, and Pt, such as Pd—Rh bimetallic nanoparticles). Some such bimetallic/multimetallic nanoparticles comprise substantially only metal components, but are not strictly limited to PGM components e.g., a Rh component and one or more metal components selected from copper, gold, silver, and combinations thereof. It is noted that the present application refers throughout to "PGM" particles, and this is intended to cover both particles consisting essentially only of PGM components and particles consisting essentially only of metal components as referenced above (comprising Rh and one or more other metal components).

An "alloyed" PGM particle is a particle comprising an intimate and random mixture of different PGM components.

A "core-shell" PGM particle is a particle comprising different PGM components that are substantially segregated, with one type of PGM residing in the core (interior) of the particle, and another type of PGM residing as a shell around the core, and any additional PGMs forming additional shells around these components.

"Thermally affixed" means that a PGM and support combination is heated, e.g., at >about 250° C., such that the PGMs are partially or completely converted to their oxide forms, resulting in the removal of any organic material present due to the use of precursor compounds, water, and processing aids such as surfactants, and providing a powdered product. Upon use of thermally affixed PGMs on supports in an aqueous (washcoat) slurry, the PGMs are not soluble and do not agglomerate within the slurry. Thermally affixed is different from chemically fixed, where the pH or some other parameter of a dispersion of a PGM salt with support is changed to render the PGM component insoluble in the dispersion.

"Precursor compound" refers to a compound that delivers a desired ingredient. For example, water-soluble, inorganically-based, or organically-based salts may be used for delivery of PGMs and other materials such as alumina, cerium, zirconium, barium, and the like and are thus considered in some embodiments to be precursor compounds.

"Primary particles" refers to individual particles of material.

"Aggregated particles" refers to an assembly of primary particles dispersed in a liquid medium. Aggregated particles have a framework of material, such as aluminum, and voids or pores resulting from the framework (between adjacent particles).

Reference to "colloidally-delivered" means that during formation of a washcoat comprising catalytic material, nanoparticles are used to deliver one or more components such as PGMs and/or support materials. This is in contrast to the use of ions of PGMs resulting from the use of precursor soluble salts to form catalytic material. Colloidal-delivery of PGMs is achieved by forming nanoparticles of PGMs and optionally purifying and concentrating them.

In one embodiment, the support components have an average primary particle size of about 1 to about 100 nm (e.g., about 5 to about 92 nm) as measured by TEM and an average aggregated particle size of less than about 500 nm, as measured by dynamic light scattering (DLS) on aqueous dispersions of support components. The support components are preferably dispersible in a liquid medium. Such support components are in contrast to the use of pre-calcined powdered supports such as gamma alumina, which are considered agglomerated particles that are micron-sized or larger dispersed in water measured by Scanning Electron Microscopy (SEM). Colloidal delivery of support components may be achieved either by dispersed nanoparticles of the desired supports themselves or by dispersed nanoparticles of precursor components of the support materials. Pre-calcined supports may be used in particular embodiments, when, for example, multimetallic nanoparticles have an average primary particle size in the range of from about 1 to about 20 nm as measured by TEM.

Reference to "support-interactive" means that a PGM, such as rhodium, is physically interacting with a support material, such as alumina. Such interaction results in a binding energy that is greater than the binding energy of a bulk/non-interacting PGM. Binding energy may be measured by X-ray photoelectron spectroscopy (XPS).

"Support average pore radius" refers to a characteristic of the support that indicates, on average, the diameter of pore openings. BJH desorption average pore radius may be measured by nitrogen-pore size distribution ($N_2$-PSD).

"Average particle size" refers to a characteristic of particles that indicates on average the diameter of the particles, as measured by TEM.

"Average aggregated particle size" refers to a characteristic of aggregated particles measured by SEM. Aggregated particles dispersed in a liquid medium can be analyzed by light scattering techniques (dynamic light scattering or static light scattering) to give an average aggregate particle size.

"BET surface area" has its usual meaning of referring to the Brunauer-Emmett-Teller method for determining surface area by $N_2$-adsorption measurements. Unless otherwise stated, "surface area" refers to BET surface area.

"Support" in a catalytic material or catalyst washcoat refers to a material that receives precious metals, stabilizers, promoters, binders, and the like through precipitation, association, dispersion, impregnation, or other suitable methods. Examples of supports include, but are not limited to, refractory metal oxides, including high surface area refractory metal oxides, and composites containing oxygen storage components.

"Refractory metal oxide supports" include, e.g., bulk alumina, ceria, zirconia, titania, silica, magnesia, neodymia, mixed oxides (for example $MgAl_2O_4$, $BaAl_{12}O_{19}$, $LaAlO_3$) or doped oxides (for example Ba-doped alumina, Ce-doped alumina, La-doped alumina), doped mixed metal oxides (for example Y-, La-, Pr- or Nd-doped CeZr-oxides), and other materials known for such use. Such materials are considered as providing durability to the resulting catalyst. Refractory metal oxide supports are generally porous.

"High surface area refractory metal oxide support" refers specifically to support materials (e.g., particles) having BET surface areas of higher than about 30 square meters per gram ("$m^2/g$"), and average pore sizes larger than about 20 Å. In some embodiments, such support materials can have a wide pore distribution. High surface area refractory metal oxide supports, e.g., alumina support materials, also referred to as "gamma alumina" or "activated alumina," typically exhibit a BET surface area in excess of about 60 "$m^2/g$", e.g., up to about 200 $m^2/g$ or, in some embodiments, even higher. Such activated alumina is usually a mixture of the gamma and delta phases of alumina, but may also contain substantial amounts of eta, kappa and theta alumina phases.

"Rare earth metal oxides" refer to one or more oxides of scandium, yttrium, and the lanthanum series, as defined in the Periodic Table of Elements. Rare earth metal oxides are both exemplary oxygen storage components (OSCs) and promoter materials. Examples of suitable oxygen storage components include ceria, praseodymia, or combinations thereof. Delivery of ceria can be achieved by the use of, for example, ceria, a mixed oxide of cerium and zirconium, and/or a mixed oxide of cerium, zirconium, and neodymium. Suitable promoters include one or more non-reducible oxides of one or more rare earth metals selected from the group consisting of lanthanum, praseodymium, yttrium, zirconium and mixtures thereof.

"Alkaline earth metal oxides" refer to Group II metal oxides, which are exemplary stabilizer materials. Suitable stabilizers include one or more non-reducible metal oxides, wherein the metal is selected from the group consisting of barium, calcium, magnesium, strontium and mixtures thereof. Preferably, the stabilizer comprises one or more oxides of barium and/or strontium.

"Washcoat" is a thin, adherent coating of a catalytic or other material applied to a refractory substrate, such as a honeycomb flow-through monolith substrate or a filter substrate, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

Components

Components for catalytic materials are supplied as follows.

While any conceivable salts may be employed as precursor components for platinum group metals (PGMs) (i.e., for the formation of the multimetallic PGM nanoparticles disclosed herein), it is generally preferred that water-soluble salts are used. As such, exemplary precursor compounds include salts selected from the group consisting of nitrates, halogenides, carboxylates, carboxylate esters, alcoholates, and mixtures of two or more thereof. Preferably, the PGMs are provided, in some embodiments, by chalogenides or carboxylates, ($C_2$-$C_5$) carboxylate esters, ($C_2$-$C_5$) alcoholates, or mixtures of two or more thereof, and in some embodiments, by chlorides or acetates.

Sources of support materials may include any oxide or hydroxide or oxyhydroxide of the desired support material, generally those that are water-dispersible. Alumina, for example, may be provided as a suspension of nano-sized alumina or aluminum oxyhydroxide particles. An exemplary suspension of aluminum oxyhydroxide particles contains boehmite (AlOOH) or pseudoboehmite. The suspension of alumina particles may comprise aluminum oxide, aluminum hydroxide, aluminum oxyhydroxide, or a mixture thereof. Anions such as nitrate, acetate, citrate and formate may coexist in a colloidal alumina suspension. In one or more embodiments, the colloidal alumina is suspended in deionized water at a solids loadings of about 5% to about 50% by weight. Pre-calcined supports, where used, are commercially available.

Suitable surfactants include, but are not limited to, water-soluble polymers. Molecular weights of exemplary polymers are generally about 1,000 to about 500,000 g/mol, and more preferably about 5,000 to about 100,000 g/mol. Polymers include homopolymers and copolymers, with linear or branched molecular structures. Suitable monomers from which such water-soluble polymers may be obtained include, but are not limited to, unsaturated carboxylic acids and esters, amides and nitriles, N-vinylcarboxyamides, alkylene oxides. Preferred water-soluble polymers are, for example, selected from poly(vinylalcohol), poly(vinylpyrrolidone), poly(ethyleneimine), poly(acrylic acid), polyaspartic acid, carbohydrates, and/or alkali metal citrates. Examples of further water-soluble polymers are provided, for example, in U.S. Patent Application Publication No. 2011/0206753 to Karpov et al., which is incorporated herein by reference.

Suitable reducing agents include, but are not limited to, alcohols or further alcohol group containing organic molecules. Alcohols include ethanol, propanol, diethylene glycol, monoethylene glycol, and any polyethylene glycol, for example, tetraethylene glycol. Preferred alcohol-containing organic molecules include citric acid or ascorbic acid. Further possible reducing agents include inorganic materials such as sodium borohydride ($NaBH_4$) or hydrogen.

Optionally, pH regulators may be used. Suitable pH regulators, if needed, may comprise acetic acid, ascorbic acid ($C_6H_8O_6$), citric acid, oxalic acid ($C_2H_2O_4$), formic acid (HCOOH), chloric acid, sodium hydroxide, and/or ammonium hydroxide.

Suitable mineralizers include, but are not limited to, potassium bromide, sodium bromide, ammonium bromide, tetramethylammonium, cetyltrimethylammonium bromide, and combinations thereof.

Nanoparticle PGM Materials

Generally, nanoparticle PGM materials are prepared as follows. A solution comprising a salt of a platinum group metal (PGM) component, a reducing agent, a surfactant and optionally a mineralizer is prepared. The resulting solution is then mixed and heated to reduce at least a portion of the PGM to a zero valance state by action of the reducing agent in the presence of the surfactant and the optional mineralizer to form a colloidal solution of PGM nanoparticles. In one embodiment, a mixture of a reducing agent, a surfactant and optionally a mineralizer is pre-heated to form an aqueous solution at temperature T1. Then a solution of a salt of a PGM component pre-heated to a temperature T2 is added. A mixture is heated at temperature T3 to reduce at least a portion of the metal to a zero valance form by the reducing agent in the presence of a surfactant and optionally a mineralizer to form a colloidal solution of PGM nanoparticles. If nanoparticle PGM materials are prepared in water, T1 and T2 are typically in the range of about 25° C. to about 100° C. and T3 is typically about 60° C. to about 100° C. If nanoparticle PGM materials are prepared in ethylene glycol, T1 and T2 are typically about 25° C. to about 180° C. and T3 is typically about 100° C. to about 180° C. In one embodiment, the prepared PGM nanoparticles can be used without purification or after purification as seeds for further growth of PGM nanoparticles. Such PGM seeds are added to a solution containing a reducing agent, a surfactant and optionally a mineralizer prior addition of a solution of a salt of a PGM component. Use of PGM seeds results in general in larger PGM nanoparticles compared to preparation of PGM nanoparticles without use of PGM seeds.

Choice of PGM precursor (e.g., salt of the PGM component), reducing agent, surfactant and optional mineralizer will impact the shape and size of the dispersible PGM nanoparticles that are produced. The amount and type of surfactant should be adequate to keep the PGM particles free of large, micron-sized agglomerates as the reducing agent reacts to make zero valance metals. The reducing agent should be present in an amount to reduce all of the metal with a slight amount of excess. The optional mineralizer enforces growth of specific PGM facets. During preparation, the salt of the PGM component may be present in the aqueous solution in an amount of about 0.01 to about 2% by weight of the solution, the surfactant may be present in the aqueous solution in an amount of about 0.1 to about 10%, more preferably about 0.1 to about 5%, by weight of the solution, the reducing agent may be present in the aqueous solution in an amount of about 0.1 to about 10%, more preferably about 0.1 to about 5%, by weight of the solution, the optional mineralizer may be p resent in an amount of about 0 to about 10%, more preferably about 0 to about 5%, by weight of the solution and the optional PGM seed can be present in an amount of about 0% to about 2%, more preferably from about 0 to about 1%, by weight of the solution.

PGM nanoparticles can be formed in various shapes: spherical, cubic, octahedral, cubooctahedral, or icosahedral.

Rh-Containing Multimetallic Nanoparticles

Rh-containing multimetallic nanoparticle materials are prepared as follows. A first PGM nanoparticle may be made independently in a manner as discussed above. In the following, formation of Pd—Rh bimetallic particles specifically is discussed, but it is understood that one or more metals other than Pd may be used to form Rh-containing multimetallic nanoparticles.

For core-shell particles, a mixture comprising a precursor of rhodium (e.g., rhodium acetate), and a reducing agent (e.g., ethylene glycol or tetraethylene glycol) is gradually added to a source of Pd nanoparticles and the resulting mixture is heated and stirred to form core-shell Pd—Rh nanoparticles.

For bimetallic Pd—Rh nanoparticles without a specific shell-core formation, an aqueous solution of a precursor for each of palladium (e.g., sodium tetrachloropalladate) and rhodium (e.g., rhodium acetate), in combination with a surfactant and reducing agent is formed. The mixture is heated and stirred to produce a colloidal suspension of Pd—Rh bimetallic nanoparticles.

Catalytic Materials

Catalytic materials are prepared as follows. In one embodiment, bimetallic nanoparticles and nanoparticles of a refractory metal oxide support or a precursor of a refractory metal oxide support are dispersed in or mixed with water to form an aqueous colloidal solution resulting in a catalytic material solution with an average aggregated particle size of less than 500 nm. In another embodiment powder containing nanoparticles of a refractory metal oxide support or a precursor of a refractory metal oxide support can be directly dispersed in an aqueous colloidal solution of PGM nanoparticles to form an aqueous colloidal solution resulting in a catalytic material solution with an average aggregated particle size of less than 500 nm. PGM nanoparticles may be obtained from an aqueous solution of colloidal PGM particles, which may be obtained as discussed herein. Nanoparticles of a refractory metal oxide support or a precursor of a refractory metal oxide support may be obtained from a colloidal solution of the refractory metal oxide or the precursor.

The catalytic material solution is dried and calcined to form a catalytic material, wherein the PGM component is thermally affixed to and is present throughout the support material, which amounts to dispersing a majority of the PGM component inside the particles of the support.

In another embodiment, a solution containing PGM nanoparticles (e.g., multimetallic nanoparticles) is impregnated on a pre-calcined support. Impregnation may be repeated several times to achieve target PGM concentration on the support. A majority of PGM nanoparticles reside inside the particles of the support, that is, within the pores of the aggregated support particles.

In one or more embodiments, less than about 50% by weight of the PGM nanoparticles are located on an external surface of the support. In other embodiments, less than about 40%, about 30%, about 20%, about 15%, about 10%, about 5%, about 2.5%, about 1%, or about 0.1% by weight of the nanoparticles are located on an external surface of the support material. That is, at least about 50% by weight, (or about 60%, about 70%, about 80%, about 85%, about 90%, about 95%, about 97.5%, about 99%, or about 99.9%) of the nanoparticles may be located inside the pores of the particles of the support. Determination of the amount of nanoparticles located inside the aggregated support material or on an external surface of the support material may employ methods known in the art such as TEM or SEM.

The exact content of PGM associated with the support material may be designed as needed for various applications. For catalytic material comprising rhodium on a support such as alumina or neodymia, the PGM (Rh) content may be about 0.1 to about 10.0% by weight rhodium in the catalytic material. For catalytic material comprising palladium on a support such as alumina, the PGM (Pd) content may be about 0.1 to about 20.0% by weight palladium in the catalytic material.

Catalytic materials so formed are prepared as powders where the PGM is affixed to the support. Such powders may then be suspended as further needed in washcoats to prepare catalyst composites.

Catalyst Composites

Once the catalytic materials are prepared, a catalyst composite may be prepared in one or more layers on a carrier. A dispersion of any of the catalytic materials as described herein may be used to form a slurry for a washcoat.

To the slurry may be added any desired additional ingredients such as other platinum group metals, other supports, other stabilizers and promoters, and one or more oxygen storage components.

In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. The slurry may thereafter comminuted to result in substantially all of the solids having particle sizes of less than about 20 microns, i.e., about 0.1 microns to about 15 microns average diameter. The comminution may be accomplished in a ball mill or other similar equipment, and the solids content of the slurry may be, e.g., about 10 to about 50 wt. %, more particularly about 10 to about 40 wt. %. The carrier may then be dipped one or more times in such slurry or the slurry may be coated on the carrier such that there will be deposited on the carrier the desired loading of the washcoat/metal oxide composite, e.g., about 0.5 to about 3.0 g/in$^3$.

Thereafter the coated carrier is calcined by heating, e.g., at about 500 to about 600° C. for about 1 to about 3 hours.

Typically, when a platinum group metal is desired, a metal component is utilized in the form of a compound or complex to achieve dispersion of the component on a refractory metal oxide support, e.g., activated alumina or a ceria-zirconia composite. For the purposes herein, the term "metal component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. During the calcination step, or at least during the initial phase of use of the composite, such compounds are converted into a catalytically active form of the metal or a compound thereof.

Additional layers may be prepared and deposited upon previous layers in the same manner as described above for deposition any layer upon the carrier.

Carrier

In one or more embodiments, a catalytic material is disposed on a carrier.

The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least about 15 wt. % of the alloy, e.g., about 10 to about 25 wt. % of chromium, about 3 to about 8 wt. % of aluminum and up to 20 wt. % of nickel. The alloys may also contain small or trace amounts of one or more other metals such as manganese, copper, vanadium, titanium and the like. The surface of the metal carriers may be oxidized at high temperatures, e.g., about 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

EMBODIMENTS

Various embodiments are listed below. It will be understood that the embodiments listed below may be combined with all aspects and other embodiments in accordance with the scope of the invention.

Embodiment 1

A catalytic material comprising: a porous refractory metal oxide support and a plurality of rhodium-containing multimetallic nanoparticles, wherein at least about 50% by weight of the nanoparticles are located inside aggregated particles of the support.

Embodiment 2

The catalytic material of embodiment 1, wherein at least about 90% by weight of the nanoparticles are located inside the aggregated particles of the support.

Embodiment 3

The catalytic material of either of embodiments 1-2, wherein the support comprises alumina.

Embodiment 4

The catalytic material of any of embodiments 1-3, wherein the rhodium-containing multimetallic nanoparticles comprise palladium-rhodium bimetallic nanoparticles.

Embodiment 5

The catalytic material of any of embodiments 1-4, wherein the average primary particle size of the rhodium-containing multimetallic nanoparticles about 1 to about 20 nm, as measured by Transmission Electron Microscopy (TEM).

Embodiment 6

The catalytic material of any of embodiments 1-5, wherein the rhodium-containing multimetallic nanoparticles are colloidally delivered and are thermally affixed to the support to form the catalytic material.

Embodiment 7

The catalytic material of any of embodiments 1-6, wherein the average aggregated particle size of the support is about 1 micron or greater, as measured by Scanning Electron Microscopy (SEM).

Embodiment 8

The catalytic material of any of embodiments 1-7, wherein the average primary particle size of the support is in about 1 to about 100 nm, as measured by Transmission Electron Microscopy (TEM).

Embodiment 9

The catalytic material of any of embodiments 1-8, wherein the support is colloidally delivered.

Embodiment 10

The catalytic material of any of embodiments 1-8, wherein the support is pre-calcined (prior to preparation of the catalytic material).

Embodiment 11

The catalytic material of any of embodiments 1-10, wherein the material is effective for conversion of one or more components of an exhaust stream of an internal combustion engine.

Embodiment 12

The catalytic material of any of embodiments 1-11, further comprising a promoter and/or a stabilizer in an amount of about 0.1 to about 30% by weight of the catalytic material.

Embodiment 13

The catalytic material of any of embodiments 1-12 having a BJH desorption average pore radius of about 3 to about 30 nm as measured by nitrogen-pore size distribution ($N_2$-PSD).

Embodiment 14

The catalytic material of any of embodiments 1-13 having a BET surface area greater than or equal to about 30 $m^2/g$ as measured by nitrogen adsorption isotherm.

Embodiment 15

The catalytic material of embodiment 5, wherein after calcination at 550° C. for two hours in air of the catalytic material starting in a fresh state, the PGM average primary particle size remains about 1 to about 20 nm as measured by Transmission Electron Microscopy (TEM).

Embodiment 16

The catalytic material of any of embodiments 1-15, wherein after calcination at 550° C. for two hours in air of the catalytic material starting in a fresh state, the multimetallic nanoparticles remain in particle form and the metals do not substantially segregate or dissolve into the aggregated particles of the support.

Embodiment 17

The catalytic material of any of embodiments 1-16, wherein the rhodium-containing multimetallic nanoparticles further comprise palladium, platinum, ruthenium, osmium, iridium, copper, gold, and/or silver.

Embodiment 18

The catalytic material of any of embodiments 1-17, wherein the rhodium-containing multimetallic nanoparticles comprise Pd, and wherein the weight ratio of Pd:Rh is about 95:5 to about 5:95.

Embodiment 19

The catalytic material of embodiment 18, wherein the weight ratio of Pd:Rh is about 1:1 to about 3:1.

Embodiment 20

The catalytic material of embodiment 19, wherein the weight ratio of Pd:Rh is about 1.3:1 to about 2.7:1.

Embodiment 21

The catalytic material of any of embodiments 1-20, wherein upon calcination in air at 550° C. for 2 hours, about 50% or more by weight of the rhodium has a binding energy in the range of 307-309 eV as measured by X-ray photoelectron spectroscopy (XPS).

Embodiment 21

The catalytic material of embodiment 11, wherein the promoter and/or the stabilizer is a rare earth oxide.

Embodiment 22

The catalytic material of embodiment 21, wherein the rare earth oxide comprises ceria, lanthana, neodymia, gadolinia, yttria, praseodymia, samaria, hafnia, or combinations thereof.

Embodiment 23

The catalytic material of embodiment 11, wherein the promoter and/or the stabilizer is an alkaline earth oxide.

Embodiment 25

The catalytic material of embodiment 24, wherein the alkaline earth oxide comprises barium or strontium oxide, or combinations thereof.

Embodiment 26

The catalytic material of any of embodiments 1-25, wherein:
the refractory metal oxide support comprises alumina;
the catalytic material optionally comprises up to 30% of a promoter and/or a stabilizer;
the catalytic material BJH desorption average pore radius is about 3 to about 30 nanometers as measured by nitrogen-pore size distribution ($N_2$-PSD); and
the rhodium-containing multimetallic nanoparticles are colloidally delivered and have an average primary particle size of about 1 to about 20 nanometers as measured by Transmission Electron Microscopy (TEM).

Embodiment 27

The catalytic material of embodiment 26, wherein the material has a lower deactivation rate than a comparative catalytic material that comprises individual rhodium and metal components as delivered by individual salts.

Embodiment 28

The catalytic material of embodiment 26 or 27, wherein the material has a higher $NO_x$ conversion activity than a comparative catalytic material that comprises individual rhodium and metal components as delivered by individual salts.

Embodiment 29

A catalyst composite for an exhaust stream of an internal combustion engine comprising the catalytic material of any one of embodiments 1-28 coated onto a carrier.

Embodiment 30

The catalyst composite of embodiment 29, further comprising one or more additional platinum group metals and/or refractory metal oxide supports and/or promoters and/or stabilizers coated onto the carrier in the same layer as or a different layer than the catalytic material.

Embodiment 31

A system for treatment of an internal combustion engine exhaust stream including hydrocarbons, carbon monoxide, and other exhaust gas components, the emission treatment system comprising: an exhaust conduit in fluid communication with the internal combustion engine via an exhaust manifold; and the catalyst composite of embodiment 29 or 30.

Embodiment 32

A method for treating exhaust gases comprising contacting a gaseous stream comprising hydrocarbons, carbon monoxide, and nitrogen oxides with the catalyst composite of embodiment 29 or 30.

Embodiment 33

A method of making a catalytic material, the method comprising: (a) obtaining rhodium-containing multimetallic nanoparticles; (b) obtaining a refractory metal oxide support; (c) preparing a solution of the nanoparticles of step (a) and the support of step (b) to form a catalytic material solution; and (d) drying and calcining the catalytic material solution of step (c) to form the catalytic material, wherein at least about 50% by weight of the rhodium-containing multimetallic nanoparticles are located inside aggregated particles of the support and are thermally affixed to the support.

Embodiment 34

The method of embodiment 33, wherein the rhodium-containing multimetallic nanoparticles have an average primary particle size of about 10 to about 20 nm as measured by Transmission Electron Microscopy (TEM).

Embodiment 35

The method of embodiment 33, wherein step (b) comprises obtaining nanoparticles of a refractory metal oxide support or a precursor of a refractory metal oxide support that have an average primary particle size of about 1 to about 100 nm as measured by Transmission Electron Microscopy (TEM) and step (c) comprises preparing an aqueous colloidal solution of the rhodium-containing nanoparticles of step (a) and the nanoparticles of step (b) to form the catalytic material solution.

Embodiment 36

The method of embodiment 33, wherein step (b) comprises obtaining a pre-calcined refractory metal oxide support comprising an average aggregated particle size that is about 1 micron or greater.

Embodiment 37

The method of any of embodiments 33-36, wherein step (a) comprises: forming an aqueous solution of a salt of rhodium, a salt of another metal, a reducing agent, and a surfactant; and mixing and heating the aqueous solution, thereby reducing at least a portion of the rhodium and other metal to a zero valance form by action of the reducing agent in the presence of a surfactant and forming an aqueous solution of rhodium-containing multimetallic nanoparticles.

Embodiment 38

The method of embodiment 37, wherein the reducing agent comprises tetraethylene glycol, ascorbic acid ($C_6H_8O_6$), oxalic acid ($C_2H_2O_4$), formic acid (HCOOH), and/or sodium borohydride ($NaBH_4$).

Embodiment 39

The method of embodiment 37, wherein the surfactant comprises poly(vinylalcohol), poly(vinylpyrrolidone), poly(ethyleneimine), poly(acrylic acid), carbohydrates, and/or alkali metal citrates.

Embodiment 40

The method of any of embodiments 33-39, wherein upon calcination, the refractory metal oxide support comprises a high surface area gamma alumina having a surface area of at least about 60 square meters per gram ($m^2/g$) and optionally comprises up to about 30% by weight of a promoter and/or a stabilizer that comprises a rare earth oxide.

EXAMPLES

The following non-limiting examples shall serve to illustrate the various embodiments of the present invention.

Figure 2:
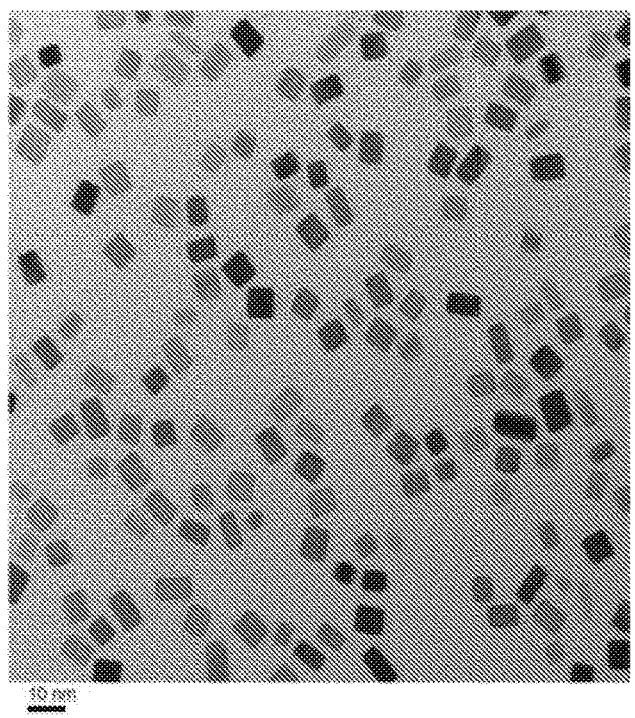

Example 1.1: Preparation of Pd Particles with Cubic Shape and an Average Particle Size of 6.9 nm 11 mL of an aqueous solution containing 105 mg of poly(vinylpyrrolidone) (PVP, MW=55,000), 60 mg of ascorbic acid, 5 mg of KBr, and 185 mg of KCl were added to a vial and preheated to 80° C. in an oil bath under magnetic stirring for 10 minutes. Subsequently, 3 mL of an aqueous solution containing 57 mg of $Na_2PdCl_4$ was added with a pipet. The reaction was allowed to continue at 80° C. for 3 hours to produce an aqueous colloidal suspension of Pd nanoparticles. A product of Pd nanoparticles was collected by centrifugation. The product was washed with DI water two times and then dispersed in 11 mL of ethylene glycol. Several batches were combined to form a stock colloidal solution for coating of Rh particles onto Pd particles (Example 1.2). TEM images of prepared Pd particles are shown in FIGS. 1-2. An average particle size was calculated based on TEM images by measuring two sides of more than 50 particles. FIG. 1 provides a TEM image of the particles with a scale of 10 nm, where the average particle size was 6.9 nm. FIG. 2 provides a magnified view of FIG. 1.

Figure 3:
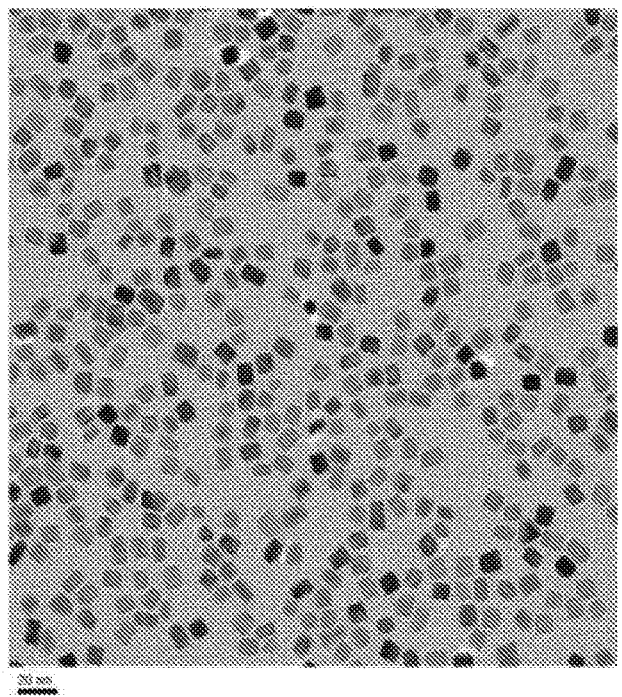
FIGS. 3-4 provide TEM images of the Pd—Rh nanoparticles of Example 1.2.
Figure 4:
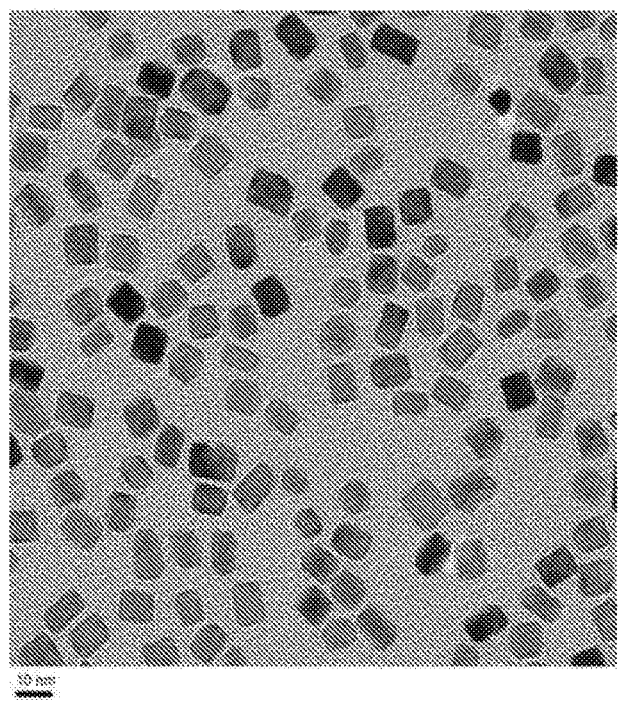

Example 1.2: Preparation of Pd—Rh Core-Shell Particles with Cubic Shape and an Average Particle Size of 8.8 nm 11 ml of ethylene glycol containing 150 mg of PVP (MW=55,000), 300 mg of ascorbic acid, 150 mg of KBr, and the 11 mL of ethylene glycol suspension from Example 1.1 containing 20.6 mg of Pd cubes were added to a vial and preheated to 160° C. in an oil bath under magnetic stirring for 10 minutes. The deposition of Rh shells was conducted by injecting 8 mL of ethylene glycol containing 250 μL of $Rh(OAc)_3$ solution (4.98 wt. % Rh) into the reaction solution at a relatively slow rate of 4.0 mL/hour and heated at 160° C. in an oil bath under magnetic stirring for 3 hours. A product of Pd—Rh core-shell particles was collected by centrifugation and washed three times with water. Several batches were combined to form a stock colloidal solution for loading of Pd—Rh particles onto an alumina support. Chemical analysis of the purified Pd—Rh bimetallic nanoparticles revealed the Rh/Pd weight ratio of 6.5/8.5. TEM images of prepared Pd—Rh particles are shown in FIGS. 3-4. An average particle size was calculated based on TEM images by measuring two sides of more than 50 particles. FIG. 3 provides a TEM image of the particles with a scale of 20 nm, where the average particle size was 8.8 nm. FIG. 4 provides a magnified view of FIG. 3.

Figure 5:
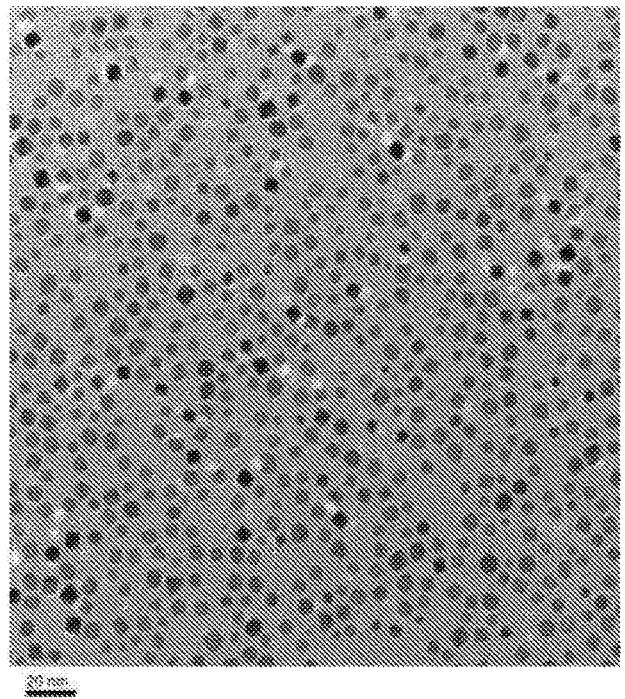
FIGS. 5-6 provide TEM images of the Pd nanoparticles of Example 1.3.
Figure 6:
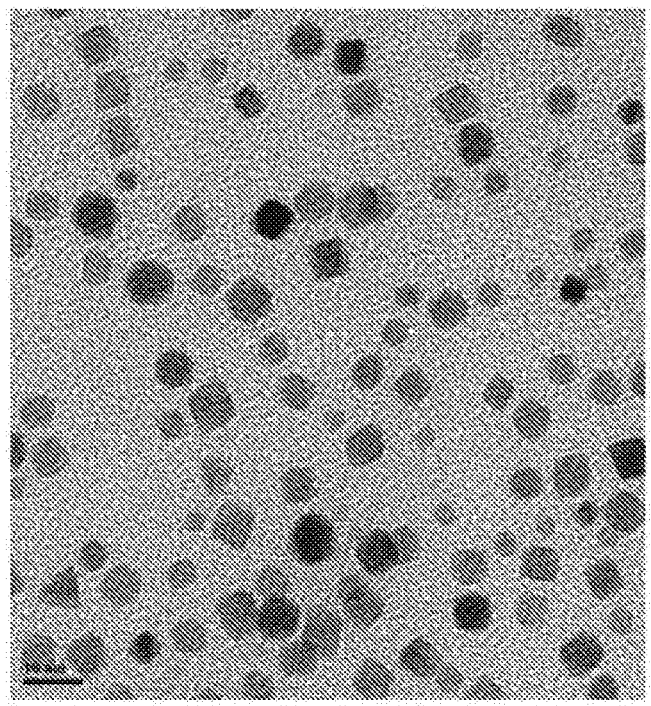

Example 1.3: Preparation of Pd Particles with Octahedral Shape and Average Particle Size of 6.3 nm 3 mL of ethanol and 5 mL of water containing 105 mg of PVP (MW=55,000) and 180 mg of citric acid were added to a vial and preheated to 80° C. in an oil bath under magnetic stirring for 10 minutes. Subsequently, 3 mL of an aqueous solution containing 57 mg of $Na_2PdCl_4$ was added. The reaction was allowed to continue at 80° C. for 3 hours. The product was dispersed in 11 mL of benzyl alcohol after washing with DI water two times. Several batches were combined to form a stock colloidal solution for coating of Rh particles onto Pd particles (Example 1.4). TEM images of prepared Pd particles are shown in FIGS. 5-6. An average particle size was calculated based on TEM images by measuring two sides of more than 50 particles. FIG. 5 provides a TEM image of the particles with a scale of 20 nm, where the average particle size was 6.3 nm. FIG. 6 provides an image of particles of FIG. 5 with a scale of 10 nm.

Figure 7:
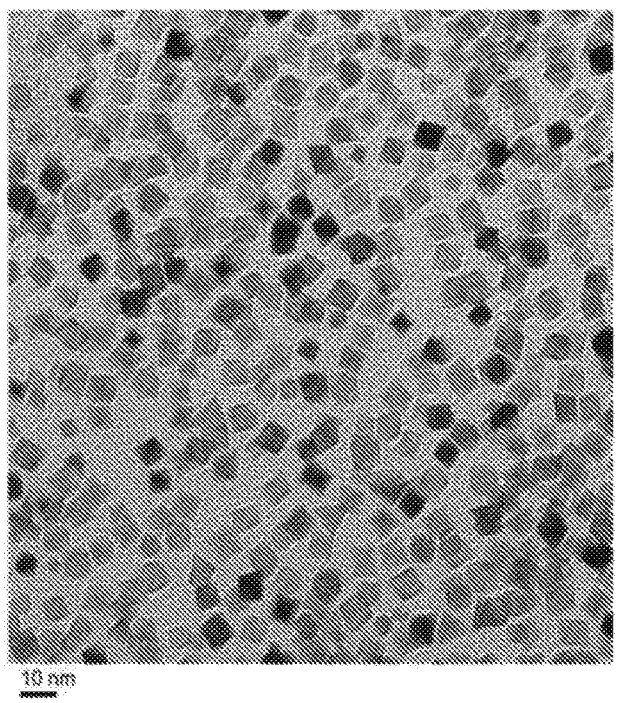
FIGS. 7-8 provide TEM images of the Pd—Rh nanoparticles of Example 1.4.
Figure 8:
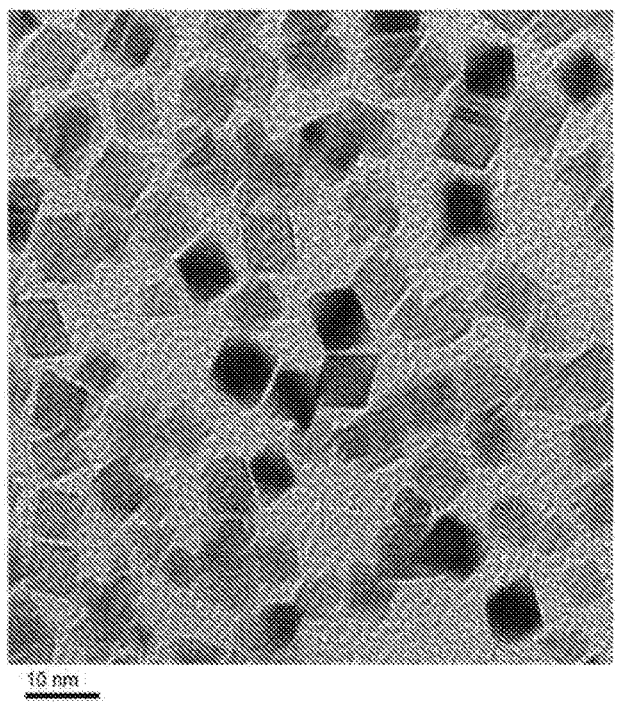

Example 1.4: Preparation of Pd—Rh Core-Shell Particles with Octahedral Shape and Average Particle Size of 7.4 nm 20 ml of tetraethylene glycol containing 220 mg of PVP (MW=55,000), 165 μL of $Rh(OAc)_3$ solution (4.98 wt. % Rh), and 11 mL of the stock solution of benzyl alcohol suspension from Example 1.3 containing 20.6 mg of Pd octahedra were added to a vial and heated at 185° C. in an oil bath under magnetic stirring for 3 hours. A product of Pd—Rh core-shell particles was collected by centrifugation and washed three times with water. Several batches were combined to form a stock colloidal solution for loading of Pd—Rh particles onto support. Chemical analysis of the purified Pd—Rh bimetallic nanoparticles revealed the Rh/Pd weight ratio of 5/8. TEM images of prepared Pd—Rh particles are shown in FIGS. 7-8. An average particle size was calculated based on TEM images by measuring two sides of more than 50 particles. FIG. 7 provides a TEM image of the particles with a scale of 10 nm, where the average particle size was 7.4 nm. FIG. 8 provides a magnified image of particles of FIG. 7.

Figure 9:
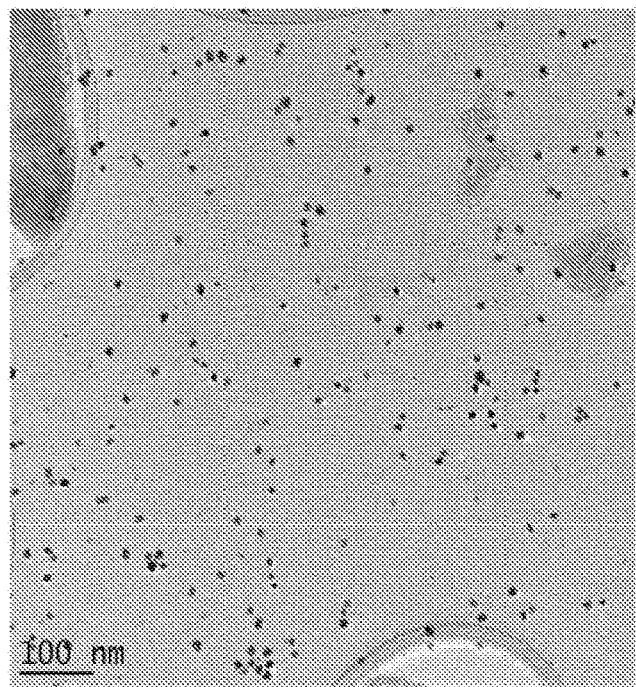
FIGS. 9-10 provide TEM images of the Pd nanoparticles of Example 1.5.
Figure 10:
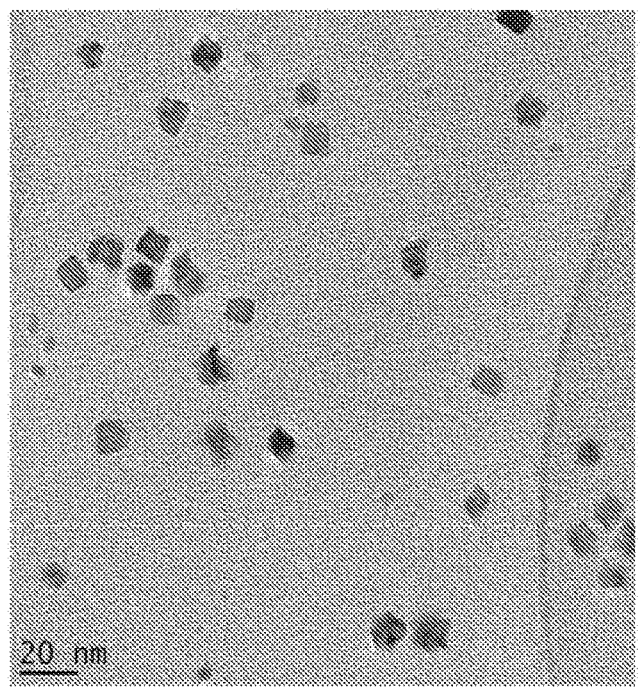

Example 1.5: Preparation of Pd—Rh Bimetallic Nanoparticles with Average Particle Size of 8.7 nm 2.89 g of poly(vinyl pyrrolidone) (PVP, MW=55,000), 2.3 g of ascorbic acid, and 28 g of KBr were added to 450 g water and preheated to 90° C. in a jacketed glass reactor under mechanic stirring for 30 minutes to form an aqueous solution. Subsequently, an aqueous solution containing 1.14 g of $Na_2PdCl_4$ (Pd-content=19.43 wt. %), 1.14 g of $Rh(OAc)_3$ (Rh-content=4.98 wt. %) and 50 g water was added with a syringe pump at a rate of 100 mL/hour. Then, 50 g water was added with a syringe pump at a rate of 100 mL/hour. The reaction was allowed to continue at 90° C. for 20 hours to produce an aqueous colloidal suspension of Pd—Rh bimetallic nanoparticles. TEM images of prepared unpurified Pd—Rh bimetallic nanoparticles are shown in FIGS. 9-10. An average particle size was calculated based on TEM images by measuring two sides of more than 50 particles. FIG. 9 provides a TEM image of the particles with a scale of 100 nm, where the average particle size was 8.7 nm. FIG. 10 provides a magnified view of particles of FIG. 9. A product of Pd—Rh bimetallic nanoparticles was purified by dialysis. The product was placed into a Fisherbrand® regenerated cellulose dialysis tube. The tube was closed from both sides and placed in a container containing 10 kg water. Water was exchanged several times to reduce Na-content in the product. Chemical analysis of the purified product revealed Na content below 10 ppm. Chemical analysis of the purified sample containing Pd—Rh bimetallic nanoparticles revealed the Rh/Pd weight ratio of 2/5.

Figure 11:
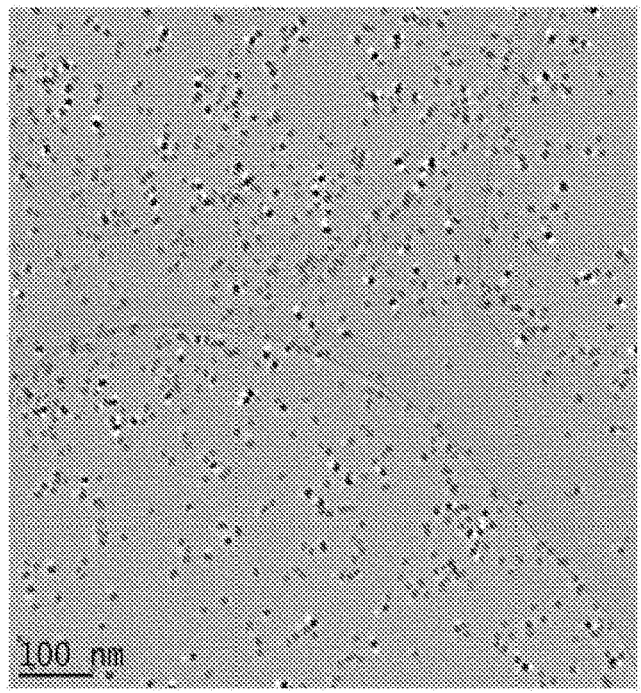
FIGS. 11-12 provide TEM images of the Pd nanoparticles of Example 1.6.
Figure 12:
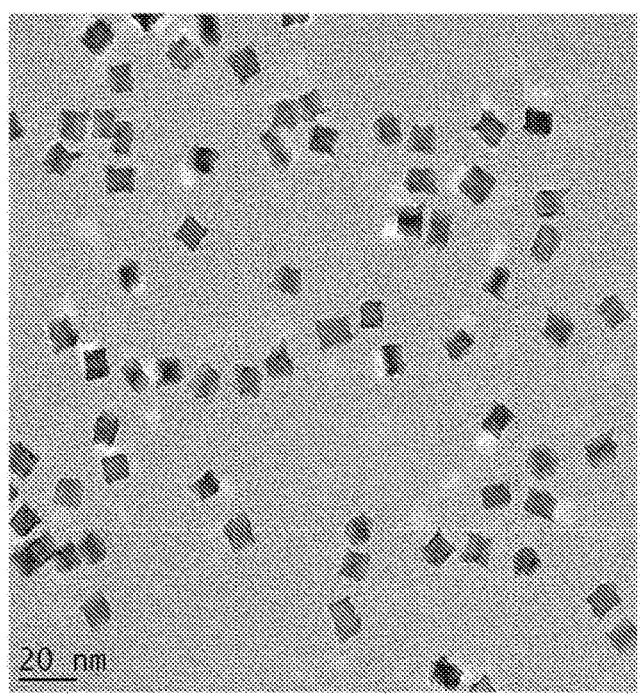

Example 1.6: Preparation of Pd—Rh Bimetallic Nanoparticles with Average Particle Size of 10 nm 26.30 g of poly(vinyl pyrrolidone) (PVP, MW=55,000), 14.97 g of ascorbic acid, and 1.25 g of KBr were added to 400 g water and preheated to 90° C. in a jacketed glass reactor under mechanic stirring for 30 minutes to form an aqueous solution. Subsequently, an aqueous solution containing 8.55 g of $Na_2PdCl_4$ (Pd-content=18.88 wt. %), 21.61 g of $Rh(OAc)_3$ (Rh-content=4.98 wt. %) and 50 g water was added with a syringe pump at a rate of 250 mL/hour. Then, 50 g water was added with a syringe pump at a rate of 250 mL/hour. The reaction was allowed to continue at 90° C. for 3 hours to produce an aqueous colloidal suspension of Pd—Rh bimetallic nanoparticles. A product of Pd—Rh bimetallic nanoparticles was purified by dialysis. The product was placed into a Fisherbrand® regenerated cellulose dialysis tube. The tube was closed from both sides and placed in a container containing 10 kg water. Water was exchanged several times to reduce Na-content in the product. Chemical analysis of the purified product revealed Na content below 10 ppm. Chemical analysis of the purified sample containing Pd—Rh bimetallic nanoparticles revealed Pd content of 2040 ppm, Rh content of 841 ppm corresponding to a Rh/Pd weight ratio of 0.41. TEM images of prepared purified Pd—Rh bimetallic nanoparticles are shown in FIGS. 11-12. An average particle size was calculated based on TEM images by measuring two sides of more than 50 particles. FIG. 11 provides a TEM image of the particles with a scale of 100 nm, where the average particle size was 10 nm. FIG. 12 provides a magnified view of particles of FIG. 11.

Figure 13:
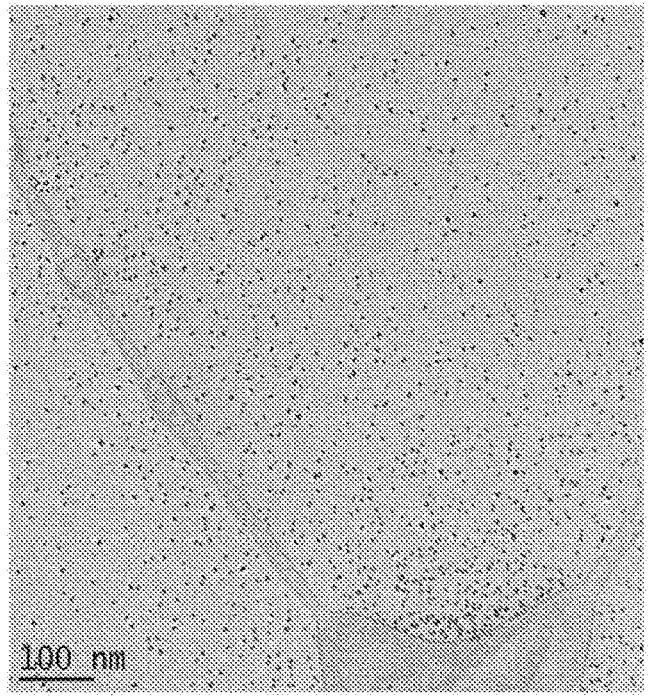
FIGS. 13-14 provide TEM images of the Pd nanoparticles of Example 1.7.
Figure 14:
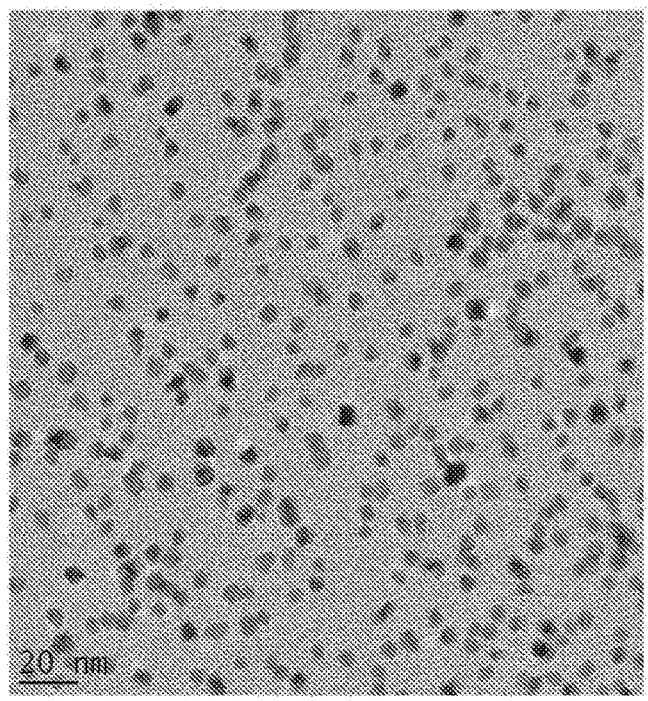

Example 1.7: Preparation of Pd—Rh Bimetallic Nanoparticles with Average Particle Size of 5 nm 26.30 g of poly(vinyl pyrrolidone) (PVP, MW=55,000), 14.97 g of ascorbic acid, and 1.25 g of KBr were added to 400 g water and preheated to 90° C. in a jacketed glass reactor under mechanic stirring for 30 minutes to form an aqueous solution. Subsequently, an aqueous solution containing 8.55 g of $Na_2PdCl_4$ (Pd-content=18.88 wt. %), 21.61 g of $Rh(OAc)_3$ (Rh-content=4.98 wt. %) and 50 g water was added with a syringe pump at a rate of 250 mL/hour. Then, 50 g water was added with a syringe pump at a rate of 250 mL/hour. The reaction was allowed to continue at 90° C. for 20 hours to produce an aqueous colloidal suspension of Pd—Rh bimetallic nanoparticles. A product of Pd—Rh bimetallic nanoparticles was purified by dialysis. The product was placed into a Fisherbrand® regenerated cellulose dialysis tube. The tube was closed from both sides and placed in a container containing 10 kg water. Water was exchanged several times to reduce Na-content in the product. Chemical analysis of the purified product revealed Na content of 11 ppm. Chemical analysis of the purified sample containing Pd—Rh bimetallic nanoparticles revealed Pd content of 2440 ppm, Rh content of 1590 ppm corresponding to a Rh/Pd weight ratio of 0.65. TEM images of prepared purified Pd—Rh bimetallic nanoparticles are shown in FIGS. 13-14. An average particle size was calculated based on TEM images by measuring two sides of more than 50 particles. FIG. 13 provides a TEM image of the particles with a scale of 100 nm, where the average particle size was 10 nm. FIG. 14 provides a magnified view of particles of FIG. 13.

Example 2.1: Preparation of Supported 0.85 wt. % Pd-0.65 wt. % Rh-Nanoparticles/$Al_2O_3$ Powder 6.2 g of acid dispersible boehmite alumina powder ($Al_2O_3$ content=79 wt. %) were dispersed in 50 mL water containing 0.1 mL acetic acid (pH 3-4) by stirring (10 minutes) and sonication (30 minutes) in an ice-cooled bath to an average particle size of 170 nm. Then an aqueous colloidal solution containing 75 mg of Pd—Rh core-shell particles with cubic shape from the Example 1.2 (Rh/Pd weight ratio=6.5/8.5) was added drop by drop under vigorous stirring. The pH of the final solution was in the range of 4-5. This solution was then sonicated for 30 minutes under ice-cooling. Subsequently, the solution was stirred at room temperature for 24 hours. Solvent water was removed by rotational evaporator at 50° C. The solid was dried in an oven at 130° C. for ~1 hour. The dried powder was calcined at 550° C. for two hours in air resulting in the 0.85 wt-% Pd-0.65 wt-% Rh-nanoparticles/$Al_2O_3$ powder. Pd and Rh weight contents on the calcined powder were confirmed by chemical analysis.

Example 2.2: Preparation of Supported 0.8 wt. % Pd-0.5 wt. % Rh-Nanoparticles/$Al_2O_3$ Powder 6.2 g of acid dispersible boehmite alumina powder ($Al_2O_3$ content=79 wt. %) were dispersed in 50 mL water containing 0.1 mL acetic acid (pH 3-4) by stirring (10 minutes) and sonication (30 minutes) in an ice-cooled bath to an average particle size of 170 nm. Then an aqueous colloidal solution containing 65 mg of Pd—Rh core-shell particles with octahedral shape from the Example 1.4 (Rh/Pd weight ratio=5/8) was added drop by drop under vigorous stirring. The pH of the final solution was in the range of 4-5. This solution was then sonicated for 30 minutes under ice-cooling. Subsequently, the solution was stirred at room temperature for 24 hours. Solvent water was removed by rotational evaporator at 50° C. The solid was dried in an oven at 130° C. for ~1 hour. The dried powder was calcined at 550° C. for two hours in air resulting in the 0.8 wt-% Pd-0.5 wt-% Rh-nanoparticles/$Al_2O_3$ powder. Pd and Rh weight contents on the calcined powder were confirmed by ICP-analysis.

Figure 15:
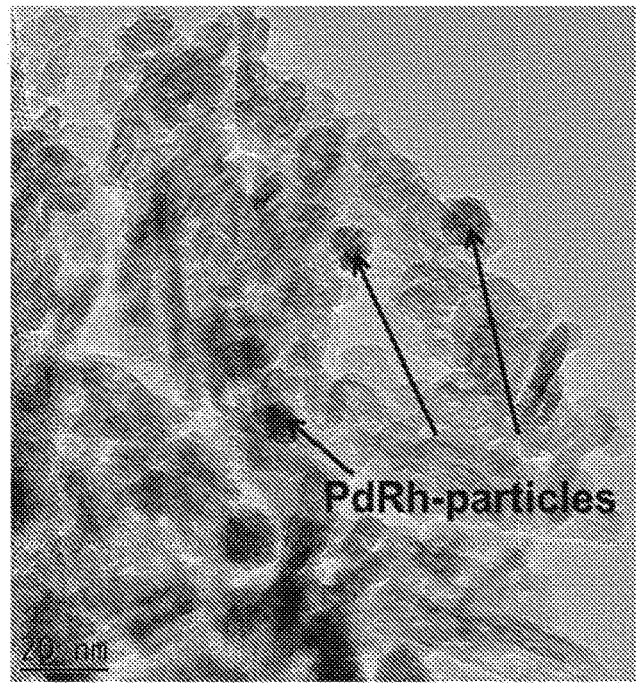
FIG. 15 provides a TEM image of the catalytic material of Example 2.3.
Figure 16:
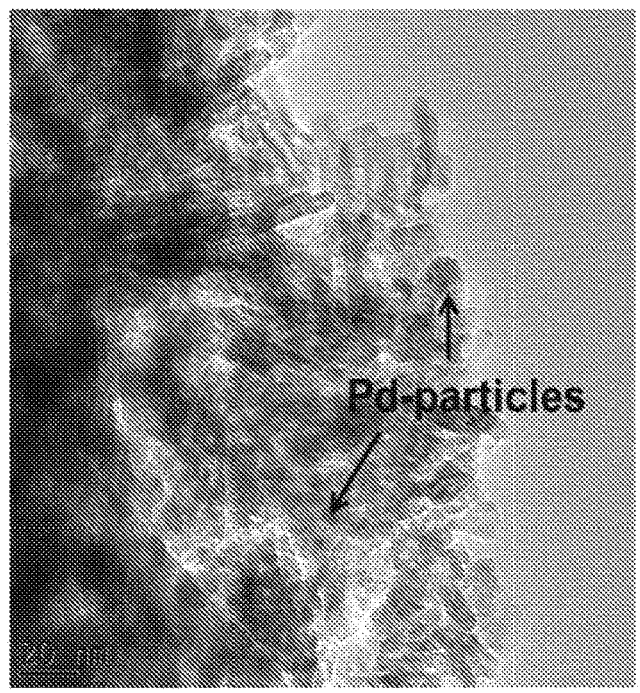
FIG. 16 provides a TEM image of the catalytic material of Comparative Example 3.3.

Example 2.3: Preparation of Supported 0.5 wt. % Pd-0.2 wt. % Rh-Nanoparticles/$Al_2O_3$ Powder 50 g of acid dispersible boehmite alumina powder ($Al_2O_3$ content=80.7 wt. %) were dispersed in 630 g of an aqueous colloidal solution containing 0.28 g of purified Pd—Rh bimetallic nanoparticles from the Example 1.5 (Rh/Pd weight ratio=2/5) under vigorous stirring. The slurry was spray-dried using a Buchi Mini Spray-Drier B-290 (outlet temperature 120° C.). The spray-dried powder was calcined at 550° C. for two hours in air resulting in the 0.5% Pd-0.2% Rh-nanoparticles/Al$_2$O$_3$ powder. Pd and Rh weight contents on the calcined powder were confirmed by chemical analysis. FIG. 15 provides a TEM image of the 0.5 wt-% Pd-0.2 wt-% Rh-nanoparticles/Al$_2$O$_3$ powder with a scale of 20 nm. Energy Dispersive Spectroscopy (EDS) confirmed presence of both Pd and Rh located in the same PGM containing nanoparticles. The TEM image combined with EDS analysis provides evidence that upon calcination in air at 550° C. for 2 hours both elements are still intimately associated with each other. Binding energy for Rh$^{3+}$ 3 d5/2 as measured by X-ray photoelectron spectroscopy (XPS) on the calcined powder was 308.4 eV.

Example 2.4: Preparation of Supported 0.52 wt. % Pd-0.21 wt. % Rh-Nanoparticles/Al$_2$O$_3$ Powder 249.5 g of acid dispersible boehmite alumina powder (Al$_2$O$_3$ content=79 wt. %) were dispersed in a mixture of 499.4 g of an aqueous colloidal solution containing purified Pd—Rh bimetallic nanoparticles from the Example 1.6 (Rh/Pd weight ratio=0.41) and 1500 g of H$_2$O under vigorous stirring. The slurry was spray-dried using a Buchi Mini Spray-Drier B-290 (outlet temperature 120° C.). The spray-dried powder was calcined at 550° C. for two hours in air resulting in the 0.52% Pd-0.21% Rh-nanoparticles/Al$_2$O$_3$ powder. Pd and Rh weight contents on the calcined powder were confirmed by chemical analysis.

Example 2.5: Preparation of Supported 0.42 wt. % Pd-0.27 wt. % Rh-Nanoparticles/Al$_2$O$_3$ Powder 371.95 g of acid dispersible boehmite alumina powder (Al$_2$O$_3$ content=79 wt. %) were dispersed in a mixture of 509.4 g of an aqueous colloidal solution containing purified Pd—Rh bimetallic nanoparticles from the Example 1.7 (Rh/Pd weight ratio=0.65) and 1500 g of H$_2$O under vigorous stirring. The slurry was spray-dried using a Buchi Mini Spray-Drier B-290 (outlet temperature 120° C.). The spray-dried powder was calcined at 550° C. for two hours in air resulting in the 0.42% Pd-0.27% Rh-nanoparticles/Al$_2$O$_3$ powder. Pd and Rh weight contents on the calcined powder were confirmed by chemical analysis.

Example 2.6: Preparation of Supported 0.35 wt. % Pd-0.23 wt. % Rh-Nanoparticles/Al$_2$O$_3$ Powder 80 g of an aqueous colloidal solution containing purified Pd—Rh bimetallic nanoparticles from the Example 1.7 (Rh/Pd weight ratio=0.65) were impregnated on 101 g of pre-calcined gamma alumina (Al$_2$O$_3$ content=98 wt. %, BET surface area=150 m$^2$/g, BJH desorption average pore radius=10 nm). The impregnated powder was dried and impregnated with another 65 g of an aqueous colloidal solution containing purified Pd—Rh bimetallic nanoparticles from the Example 1.7 (Rh/Pd weight ratio=0.65). The spray-dried powder was calcined at 550° C. for two hours in air resulting in the 0.35% Pd-0.23% Rh-nanoparticles/Al$_2$O$_3$ powder. Pd and Rh weight contents on the calcined powder were confirmed by chemical analysis.

Example 3.1 (Comparative): Preparation of Supported 0.85 wt. % Pd-0.65 wt. % Rh/Al$_2$O$_3$ Powders by Co-Impregnation of an Aqueous Solution Containing a Mixture of Pd-Nitrate and Rh-Nitrate on Pre-Calcined Alumina A mixture of 3 g of an aqueous solution of Pd-nitrate (Pd-content of 28.57 wt. %), 6.5 g of an aqueous solution of Rh-nitrate (Rh-content of 10.01 wt. %), and 77 g of H$_2$O was impregnated on 100.5 g of pre-calcined gamma alumina (Al$_2$O$_3$ content=98 wt. %, BET surface area=150 m$^2$/g, BJH desorption average pore radius=10 nm). The impregnated powder was dried at 90° C. for 4 hours and calcined in air at 550° C. for two hours. Pd and Rh weight contents on the calcined powder were confirmed by chemical analysis.

Example 3.2 (Comparative): Preparation of Supported 0.8 wt. % Pd-0.5 wt. % Rh/Al$_2$O$_3$ Powders by Co-Impregnation of an Aqueous Solution Containing a Mixture of Pd-Nitrate and Rh-Nitrate on Pre-Calcined Alumina A mixture of 2.8 g of an aqueous solution of Pd-nitrate (Pd-content of 28.57 wt. %), 5 g of an aqueous solution of Rh-nitrate (Rh-content of 10.01 wt. %), and 79 g of H$_2$O was impregnated on 100.5 g of pre-calcined gamma alumina (Al$_2$O$_3$ content=98 wt. %, BET surface area=150 m$^2$/g, BJH desorption average pore radius=10 nm). The impregnated powder was dried at 90° C. for 4 hours and calcined in air at 550° C. for two hours. Pd and Rh weight contents on the calcined powder were confirmed by chemical analysis.

Example 3.3 (Comparative): Preparation of Supported 0.5 wt. % Pd-0.2 wt. % Rh/Al$_2$O$_3$ Powders by Co-Impregnation of an Aqueous Solution Containing a Mixture of Pd-Nitrate and Rh-Nitrate on Pre-Calcined Alumina A mixture of 1.74 g of an aqueous solution of Pd-nitrate (Pd-content of 28.57 wt. %), 1.98 g of an aqueous solution of Rh-nitrate (Rh-content of 10.01 wt. %), and 82 g of H$_2$O was impregnated on 100.5 g of pre-calcined gamma alumina (Al$_2$O$_3$ content=98 wt. %, BET surface area=150 m$^2$/g, BJH desorption average pore radius=10 nm). The impregnated powder was dried at 90° C. for 4 hours and calcined in air at 550° C. for two hours. FIG. 12 provides a TEM image with a scale of 20 nm of the 0.5% Pd-0.2% Rh/Al$_2$O$_3$ powder prepared by co-impregnation of an aqueous solution containing a mixture of Pd-nitrate and Rh-nitrate on pre-calcined gamma alumina followed by calcination in air at 550° C. for two hours. Pd and Rh weight contents on the calcined powder were confirmed by chemical analysis. EDS-analysis revealed presence of only Pd in the PGM containing nanoparticles. The TEM image combined with EDS analysis provides evidence that co-impregnation of an aqueous solution containing a mixture of Pd-nitrate and Rh-nitrate results in spatial separation of Pd from Rh. This method does not yield bimetallic Pd—Rh nanoparticles deposited on oxide support. Binding energy for Rh$^{3+}$ 3 d5/2 as measured by X-ray photoelectron spectroscopy (XPS) on the calcined powder was 310.2 eV.

Example 3.4 (Comparative): Preparation of Supported 0.52 wt. % Pd-0.21 wt. % Rh/Al$_2$O$_3$ Powders by Co-Impregnation of an Aqueous Solution Containing a Mixture of Pd-Nitrate and Rh-Nitrate on Pre-Calcined Alumina Preparation was similar to comparative examples 3.1-3.3. Amounts of utilized Pd-nitrate and Rh-nitrate were adjusted to achieve Pd-content of 0.52 wt. % and Rh-content of 0.21 wt. % in the final catalyst after calcination in air at 550° C. for two hours.

Example 3.5 (Comparative): Preparation of Supported 0.42 wt. % Pd-0.27 wt. % Rh/Al$_2$O$_3$ Powders by Co-Impregnation of an Aqueous Solution Containing a Mixture of Pd-Nitrate and Rh-Nitrate on Pre-Calcined Alumina Preparation was similar to comparative examples 3.1-3.3. Amounts of utilized Pd-nitrate and Rh-nitrate were adjusted to achieve Pd-content of 0.42 wt. % and Rh-content of 0.27 wt. % in the final catalyst after calcination in air at 550° C. for two hours.

Example 3.6 (Comparative): Preparation of Supported 0.35 wt. % Pd-0.23 wt. % Rh/Al$_2$O$_3$ Powders by Co-Impregnation of an Aqueous Solution Containing a Mixture of Pd-Nitrate and Rh-Nitrate on Pre-Calcined Alumina Preparation was similar to comparative examples 3.1-3.3. Amounts of utilized Pd-nitrate and Rh-nitrate were adjusted to achieve Pd-content of 0.35 wt. % and Rh-content of 0.23 wt. % in the final catalyst after calcination in air at 550° C. for two hours.

Example 4: Testing

Table 1 provides a summary of prepared supported Pd—Rh/Al$_2$O$_3$ catalytic material.

Performance Testing for TWC Application

Shaping and Oven Aging Procedure:

Powder samples were set to slurry (approx. 30 wt. % solid content) and mixed with 3 wt. % boehmite dispersion as binder. After drying and calcination (1 h, 550° C. in air), the resulting cake was crushed and sieved to a particle size of 250-500 μm, which is used for testing (fresh state).

For aging, a fraction of the shaped powder was placed as a shallow bed in a temperature resistant ceramic crucible. In a muffle oven, the temperature was ramped up under a flow of air and 10% steam. After reaching the desired value of 1000° C. the temperature was kept constant for 5 h, then the heating was switched off (aged state).

Test Conditions:

Catalytic performance tests on fresh and aged powders were performed in a 48 fold screening reactor system using a gas mixture simulating exhaust conditions of a stoichiometrically operated gasoline engine.

100 mg of shaped powder (fresh or aged) was diluted with corundum of the same particle size to represent 1 mL of a coated catalyst with a typical washcoat loading and placed in the reactor. The samples were exposed to a feed gas with oscillating composition (1 s lean, 1 s rich) at a GHSV of 70000 h−1 (normalized to 1 mL coated catalyst). Concentrations for the lean and rich mixture are given in Table 2, the average air/fuel ratio is adjusted to λ=1 (i.e. to stoichiometric air/fuel ratio). To estimate light-off temperatures, the samples were tested twice under stationary conditions at different discrete temperature levels (T=200, 225, 250, 275,

TABLE 1

| | Pd—Rh-content by weight (based on entire catalytic material) | Pd—Rh component | Support precursor |
|---|---|---|---|
| Example 2.1 | 0.85% Pd-0.65% Rh | Core-shell particles with cubic shape and an average particle size of 8.8 nm according to Example 1.2 | Acid dispersible AlOOH |
| Example 2.2 | 0.8% Pd-0.5% Rh | Core-shell particles with octahedral shape and an average particle size of 7.4 nm according to Example 1.4 | Acid dispersible AlOOH |
| Example 2.3 | 0.5% Pd-0.2% Rh | Bimetallic particles with an average particle size of 8.7 nm according to Example 1.5 | Acid dispersible AlOOH |
| Example 2.4 | 0.52% Pd-0.21% Rh | Bimetallic particles with an average particle size of 10 nm according to Example 1.6 | Acid dispersible AlOOH |
| Example 2.5 | 0.42% Pd-0.27% Rh | Bimetallic particles with an average particle size of 5 nm according to Example 1.7 | Acid dispersible AlOOH |
| Example 2.6 | 0.35% Pd-0.23% Rh | Bimetallic particles with an average particle size of 5 nm according to Example 1.7 | gamma Al$_2$O$_3$, S$_{BET}$ = 150 m$^2$/g, BJH pore radius = 10 nm |
| Example 3.1 (COMPARATIVE) | 0.85% Pd-0.65% Rh | Aqueous solution of Pd-nitrate & Aqueous solution of Rh-nitrate | gamma Al$_2$O$_3$, S$_{BET}$ = 150 m$^2$/g, BJH pore radius = 10 nm |
| Example 3.2 (COMPARATIVE) | 0.8% Pd-0.5% Rh | Aqueous solution of Pd-nitrate & Aqueous solution of Rh-nitrate | gamma Al$_2$O$_3$, S$_{BET}$ = 150 m$^2$/g, BJH pore radius = 10 nm |
| Example 3.3 (COMPARATIVE) | 0.5% Pd-0.2% Rh | Aqueous solution of Pd-nitrate & Aqueous solution of Rh-nitrate | gamma Al$_2$O$_3$, S$_{BET}$ = 150 m$^2$/g, BJH pore radius = 10 nm |
| Example 3.4 (COMPARATIVE) | 0.52% Pd-0.21% Rh | Aqueous solution of Pd-nitrate & Aqueous solution of Rh-nitrate | gamma Al$_2$O$_3$, S$_{BET}$ = 150 m$^2$/g, BJH pore radius = 10 nm |
| Example 3.5 (COMPARATIVE) | 0.42% Pd-0.27% Rh | Aqueous solution of Pd-nitrate & Aqueous solution of Rh-nitrate | gamma Al$_2$O$_3$, S$_{BET}$ = 150 m$^2$/g, BJH pore radius = 10 nm |
| Example 3.6 (COMPARATIVE) | 0.35% Pd-0.23% Rh | Aqueous solution of Pd-nitrate & Aqueous solution of Rh-nitrate | gamma Al$_2$O$_3$, S$_{BET}$ = 150 m$^2$/g, BJH pore radius = 10 nm |

300, 325, 350, 375, 400, 425, 450° C.). At each temperature level the conversion was measured as an average value over a 30 s sampling time. The conversion vs. temperature curves were then interpolated using a local regression model and light-off temperatures ($T_{50}$-NO=temperature of 50% NO conversion) were extracted from this interpolation.

TABLE 2

Lean and rich feed composition in light-off tests with λ-perturbation

|  | Lean | Rich |
|---|---|---|
| CO [vol.-%] | 0.71 | 2.33 |
| $H_2$ [vol.-%] | 0.23 | 0.77 |
| $O_2$ [vol.-%] | 1.8 | 0.8 |
| HC (Propylene:Propane 2:1 or 3:1*) [ppmv $C_1$] | 3000 | 3000 |
| NO [ppmv] | 1500 | 1500 |
| $CO_2$ [vol.-%] | 14 | 14 |
| $H_2O$ [vol.-%] | 10 | 10 |

Performance data from the second run are summarized in Table 3, and full NO conversion vs. curves for selected examples are given in FIGS. 17-19. The figures give raw data as well as the interpolated curves used for $T_{50}$ extraction. At the same Rh content, catalysts based on Pd—Rh bimetallic nanoparticles (after aging) showed lower NO light-off temperatures than catalysts prepared by co-impregnation of aqueous solutions of Pd and Rh nitrates (after aging). This provides evidence for suppressed Rh deactivation in catalysts based on Pd—Rh bimetallic nanoparticles as disclosed herein.

TABLE 3

Catalytic performance data of prepared supported Pd—Rh/$Al_2O_3$ catalysts.

| Example | Composition | $T_{50}$-NO[fresh] | $T_{50}$-NO[aged] |
|---|---|---|---|
| Example 2.1 | 0.85% Pd 0.65% Rh-nanoparticles/$Al_2O_3$ | 232 | 268 |
| COMPARATIVE Example 3.1 | 0.85% Pd 0.65% Rh/$Al_2O_3$ co-impregnation of Pd, Rh-nitrates | 215 | 279 |
| Example 2.2 | 0.8% Pd 0.5% Rh-nanoparticles/$Al_2O_3$ | 232 | 274 |
| COMPARATIVE Example 3.2 | 0.8% Pd 0.5% Rh/$Al_2O_3$ co-impregnation of Pd, Rh-nitrates | 217 | 291 |
| Example 2.3 | 0.5% Pd 0.2% Rh-nanoparticles/$Al_2O_3$ | 236 | 285 |
| COMPARATIVE Example 3.3 | 0.5% Pd 0.2% Rh/$Al_2O_3$ co-impregnation of Pd, Rh-nitrates | 238 | 322 |
| Example 2.4 | 0.52%Pd 0.21% Rh-nanoparticles/$Al_2O_3$ | 237 | 296 |
| COMPARATIVE Example 3.4 | 0.52%Pd 0.21% Rh/$Al_2O_3$ co-impregnation of Pd, Rh-nitrates | 236 | 330 |
| Example 2.5 | 0.42% Pd 0.27% Rh-nanoparticles/$Al_2O_3$ | 233 | 273 |
| COMPARATIVE Example 3.5 | 0.42% Pd 0.27% Rh/$Al_2O_3$ co-impregnation of Pd, Rh-nitrates | 238 | 316 |
| Example 2.6 | 0.35% Pd 0.23% Rh-nanoparticles/$Al_2O_3$ | 237 | 294 |
| COMPARATIVE Example 3.6 | 0.35% Pd 0.23% Rh/$Al_2O_3$ co-impregnation of Pd, Rh-nitrates | 238 | 311 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A catalytic material comprising:
   a porous refractory metal oxide support in the form of aggregated particles; and
   a plurality of rhodium-containing multimetallic nanoparticles, wherein at least about 50% by weight of the nanoparticles are located inside the aggregated particles of the support.

2. The catalytic material of claim 1, wherein at least about 90% by weight of the nanoparticles are located inside the aggregated particles of the support.

3. The catalytic material of claim 1, wherein the support comprises alumina.

4. The catalytic material of claim 1, wherein the rhodium-containing multimetallic nanoparticles comprise palladium-rhodium bimetallic nanoparticles.

5. The catalytic material of claim 1, wherein the average primary particle size of the rhodium-containing multimetallic nanoparticles is about 1 to about 20 nm as measured by Transmission Electron Microscopy (TEM).

6. The catalytic material of claim 1, wherein the rhodium-containing multimetallic nanoparticles are colloidally delivered and thermally affixed to the support to form the catalytic material.

7. The catalytic material of claim 1, wherein the average aggregated particle size of the support is about 1 micron or greater as measured by Scanning Electron Microscopy (SEM).

8. The catalytic material of claim 1, wherein an average primary particle size of the support is about 1 to about 100 nm as measured by Transmission Electron Microscopy (TEM).

9. The catalytic material of claim 1, wherein the support is colloidally delivered.

10. The catalytic material of claim 1, wherein the support is pre-calcined.

11. The catalytic material of claim 1, wherein the catalytic material is effective for conversion of one or more components of an exhaust stream of an internal combustion engine.

12. The catalytic material of claim 1, further comprising one or both of a promoter and a stabilizer, in an amount of about 0.1 to about 30% by weight based on the weight of the catalytic material.

13. The catalytic material of claim 1, wherein the material has a BJH desorption average pore radius of about 3 to about 30 nanometers as measured by nitrogen-pore size distribution ($N_2$—PSD).

14. The catalytic material of claim 1, wherein the material has a BET surface area greater than or equal to about 30 $m^2/g$ as measured by nitrogen adsorption isotherm.

15. The catalytic material of claim 5, wherein after the catalytic material in fresh state is calcined at 550° C. for two hours in air, the rhodium-containing multimetallic nanoparticle average primary particle size remains about 1 to about 20 nm as measured by Transmission Electron Microscopy (TEM).

16. The catalytic material of claim 1, wherein after the catalytic material in fresh state is calcined at 550° C. for two hours in air, the multimetallic nanoparticles remain in particle form and the metals do not segregate or dissolve into the aggregated particles of the support.

17. The catalytic material of claim 1, wherein the rhodium-containing multimetallic nanoparticles further comprise a metal selected from the group consisting of palladium, platinum, ruthenium, osmium, iridium, copper, gold, silver, or a combination thereof.

18. The catalytic material of claim 1, wherein the weight ratio of Pd:Rh is about 95:5 to about 5:95.

19. The catalytic material of claim 18, wherein the weight ratio of Pd:Rh is about 1:1 to about 3:1.

20. The catalytic material of claim 19, wherein the weight ratio of Pd:Rh is about 1.3:1 to about 2.7:1.

21. The catalytic material of claim 1, wherein upon calcination in air at 550° C. for 2 hours, about 50% or more by weight of the rhodium has a binding energy of 307-309 eV as measured by X-ray photoelectron spectroscopy (XPS).

22. The catalytic material of claim 12, wherein one or both of the promoter and the stabilizer is a rare earth oxide.

23. The catalytic material of claim 22, wherein the rare earth oxide is selected from the group consisting of ceria, lanthana, neodymia, gadolinia, yttria, praseodymia, samaria, hafnia, and combinations thereof.

24. The catalytic material of claim 12, wherein one or both of the promoter and the stabilizer is an alkaline earth oxide.

25. The catalytic material of claim 24, wherein the alkaline earth oxide is selected from the group consisting of barium oxide, strontium oxide, or a combination thereof.

26. The catalytic material of claim 1, wherein:
the refractory metal oxide support comprises alumina;
the catalytic material optionally comprises up to about 30% of a promoter, stabilizer, or both a promoter and a stabilizer;
the catalytic material BJH desorption average pore radius is about 3 to about 30 nanometers as measured by nitrogen-pore size distribution ($N_2$—PSD); and
the rhodium-containing multimetallic nanoparticles are colloidally delivered and have an average primary particle size of about 1 to about 20 nanometers as measured by Transmission Electron Microscopy (TEM).

27. The catalytic material of claim 26, wherein the catalytic material has a lower deactivation rate than a comparative catalytic material comprising individual rhodium and metal components as delivered by individual salts.

28. The catalytic material of claim 26, wherein the catalytic material has higher $NO_x$ conversion activity than a comparative catalytic material comprising individual rhodium and metal components as delivered by individual salts.

29. A catalyst composite for an exhaust stream of an internal combustion engine comprising: the catalytic material of claim 1 coated onto a carrier.

30. The catalyst composite of claim 29, further comprising one or more additional components selected from platinum group metals, refractory metal oxide supports, promoters, and stabilizers, coated onto the carrier in the same layer as or a different layer than the catalytic material.

31. A system for treatment of an internal combustion engine exhaust stream including hydrocarbons, carbon monoxide, nitrogen oxides, and other exhaust gas components, the emission treatment system comprising:
an exhaust conduit in fluid communication with the internal combustion engine via an exhaust manifold; and
the catalyst composite of claim 29.

32. A method for treating exhaust gases comprising contacting a gaseous stream comprising hydrocarbons, carbon monoxide, and nitrogen oxides with the catalyst composite of claim 29.

33. A method of making a catalytic material, the method comprising:
(a) obtaining rhodium-containing multimetallic nanoparticles;
(b) obtaining a refractory metal oxide support;
(c) preparing a solution of the nanoparticles of step (a) and the support of step (b) to form a catalytic material solution, wherein the support is in the form of aggregated particles;
(d) drying and calcining the catalytic material solution of step (c) to form the catalytic material, wherein at least about 50% by weight of the rhodium-containing multimetallic nanoparticles are located inside the aggregated particles of the support and are thermally affixed to the support.

34. The method of claim 33, wherein the rhodium-containing multimetallic nanoparticles have an average primary particle size of about 10 to about 20 nm as measured by Transmission Electron Microscopy (TEM).

35. The method of claim 33, wherein step (b) comprises obtaining nanoparticles of a refractory metal oxide support or a precursor of a refractory metal oxide support with an average primary particle size of about 1 to about 100 nm measured by Transmission Electron Microscopy (TEM) and step (c) comprises preparing an aqueous colloidal solution of the rhodium-containing nanoparticles of step (a) and the nanoparticles of step (b) to form the catalytic material solution.

36. The method of claim 33, wherein step (b) comprises obtaining a pre-calcined refractory metal oxide support with an average aggregated particle size of about 1 micron or greater.

37. The method of claim 33, wherein step (a) comprises:
forming an aqueous solution of a salt of rhodium and another metal, a reducing agent, and a surfactant; and mixing and heating the aqueous solution, thereby reducing at least a portion of the metal to a zero valance form by action of the reducing agent in the presence of the surfactant and forming an aqueous solution of rhodium-containing multimetallic nanoparticles.

38. The method of claim 37, wherein the reducing agent is selected from the group consisting of tetraethylene glycol, ascorbic acid ($C_6H_8O_6$), oxalic acid ($C_2H_2O_4$), formic acid (HCOOH), sodium borohydride ($NaBH_4$), and mixtures thereof.

39. The method of claim 37, wherein the surfactant is selected from the group consisting of poly(vinylalcohol), poly(vinylpyrrolidone), poly(ethyleneimine), poly(acrylic acid), carbohydrates, alkali metal citrates, and mixtures thereof.

40. The method of claim 33, wherein, after calcination, the refractory metal oxide support comprises a high surface area gamma alumina having a surface area of at least about 60 square meters per gram ($m^2/g$) and wherein the catalytic material optionally further comprises up to about 30% of a promoter, a stabilizer, or both a promoter and a stabilizer that comprises a rare earth oxide.

* * * * *